(12) United States Patent
Hubbuch et al.

(10) Patent No.: US 7,226,535 B2
(45) Date of Patent: Jun. 5, 2007

(54) BED ADSORPTION SYSTEM

(75) Inventors: Jurgen Hubbuch, Aachen (DE); Timothy J. Hobley, Copenhagen S (DK); Owen R. T. Thomas, Copenhagen Ø (DK); Allan Lihme, Birkerød (DK); Marie B. Hansen, Nivå (DK); Morten A. Olander, Hillerød (DK)

(73) Assignee: Upfront Chromatography A/S, Copenhagen (DK)

( * ) Notice: Subject to any disclaimer, the term of this patent is extended or adjusted under 35 U.S.C. 154(b) by 0 days.

(21) Appl. No.: 11/224,077

(22) Filed: Sep. 13, 2005

(65) Prior Publication Data

US 2006/0060536 A1    Mar. 23, 2006

Related U.S. Application Data

(62) Division of application No. 10/275,873, filed as application No. PCT/DK01/00332 on May 10, 2001, now Pat. No. 6,977,046.

(30) Foreign Application Priority Data

May 12, 2000    (DK)  ............................. 2000 00784

(51) Int. Cl.
    *B01D 15/08*    (2006.01)
(52) U.S. Cl. .................. 210/198.2; 210/656; 210/660; 210/661
(58) Field of Classification Search .............. 210/656, 210/660, 661, 198.2; 422/139, 143
    See application file for complete search history.

(56) References Cited

U.S. PATENT DOCUMENTS

| | | | |
|---|---|---|---|
| 3,402,126 A | 9/1968 | Cioffi | |
| 4,032,407 A | 6/1977 | Scott et al. | |
| 4,249,828 A | 2/1981 | Condolios | |
| 4,381,703 A | 5/1983 | Crimmins et al. | |
| 5,040,310 A | 8/1991 | Hüttlin | |
| 6,043,067 A | 3/2000 | Lihme et al. | |
| 6,610,200 B1 | 8/2003 | Leijon et al. | |
| 6,706,191 B1 | 3/2004 | Leijon et al. | |

FOREIGN PATENT DOCUMENTS

| | | |
|---|---|---|
| DE | 1642812 | 4/1971 |
| EP | 0005650 | 11/1979 |
| EP | 0007783 | 2/1980 |
| EP | 0025309 | 3/1981 |
| EP | 0088404 | 9/1983 |
| EP | 0175568 | 3/1986 |
| EP | 0243845 | 11/1987 |
| EP | 0538350 | 4/1993 |
| WO | 9501831 | 1/1995 |
| WO | 9520427 | 8/1995 |
| WO | 9965586 | 12/1999 |

*Primary Examiner*—Ernest G. Therkorn
(74) *Attorney, Agent, or Firm*—Harness, Dickey & Pierce, PLC

(57) ABSTRACT

The invention relates to a method of distributing a liquid in the fluid bed of an up-flow or a down-flow fluid bed reactor. The invention provides efficient distribution and plug flow like fluid flow through the fluid bed where turbulence and/or back-mixing of the fluid are minimized. In accordance with the invention a fluid bed system for use in treating a fluid by contacting the fluid with a solid phase media is provided and the system includes a reactor chamber adapted to contain the solid phase media and at least one fluid distribution means adapted to distribute and/or deliver the fluid to be treated among the particles of the medium.

49 Claims, 34 Drawing Sheets

Table 1. Comparison of observed and theoretical fluid movement rates in the expanded bed column.

| Measurement | Dye breakthrough at the bed surface | Dye band rate at the column wall |
|---|---|---|
| Interstitial fluid velocity observed (cm h$^{-1}$) | 572 ± 60 | 460 ± 6 |
| Theoretical Interstitial fluid velocity (cm h$^{-1}$) | 470 | 490 |
| Expanded bed height (cm) | 53 | 44.8 |
| Settled bed height (cm) | 35 | 31.5 |
| Bed voidage | 0.604 | 0.578 |
| rotation rate (rpm) | 2.5 | 2.5 |
| n | 2 | 3 |

Table II. Effect of distributor rotation rate on number of theoretical plates and coefficient of axial dispersion.

| Rotation rate (rpm) | Settled bed height (cm) | Number of theoretical plates | $D_{ax}$ ($\times 10^{-6}$ m$^2$s$^{-1}$) |
| --- | --- | --- | --- |
| 0 | 29.4 | 8.3 | 19.2 |
| 2.5 | 30.9 | 29.4 | 6.08 |
| 3.75 | 29.7 | 26.6 | 6.34 |
| 5 | 29.7 | 23.2 | 7.32 |
| 7.5 | 29.7 | 21.7 | 7.91 |
| 10 | 30.5 | 22.5 | 8.08 |

BED ADSORPTION SYSTEM

CROSS REFERENCE TO RELATED APPLICATIONS

This is a divisional of, and claims priority under 35 U.S.C. §120 on, U.S. application Ser. No. 10/275,873, filed Jun. 20, 2003, now U.S. Pat. No. 6,977,046, which is a National Phase entry of PCT/DK01/00332 filed on May 10, 2001, which further claims priority under 35 U.S.C. §119 to Denmark 2000 00784, filed May 12, 2000, the contents of both of which are incorporated by reference.

The present invention relates to a method of distributing a liquid in the fluid bed of an up-flow or a down-flow fluid bed reactor.

FIELD OF THE INVENTION

The field of this invention is fluid bed reactors and methods for distribution of fluid in fluid bed reactors to obtain efficient distribution and a plug flow like fluid flow through the fluid bed where turbulence and/or back-mixing of the fluid are minimised, such as avoided Particularly interesting is the field of expanded bed adsorption and fluid bed reactors used for this purpose.

BACKGROUND OF THE INVENTION

Generally, a fluid bed reactor, may comprise a vertical reactor with an inlet, an outlet, a fluid bed of particles (a solid phase), and a liquid. The liquid is introduced at the inlet and dispersed, optionally through a gas head in case of down-flow reactors, on the bed of solid phase particles, which are suspended and fluidised by the liquid. The liquid is conducted through the bed and a pool of reacted and/or unreacted fluid is let out at the outlet.

Up-flow fluid reactors have liquid inlet at or near the bottom of the reactor and solid phase particles of specific gravity larger than that of the liquid.

Down-flow fluid bed reactors have liquid inlet at or near the top of the reactor and solid phase particles of specific gravity less than that of the liquid.

The suspended and fluidised solid phase particles may be impermeable to the fluid or completely permeable to the fluid and substances present in the fluid. The suspended and fluidised solid phase particles may further be reactive or may carry immobilised reactive components selected for solid phase chemical or physical processes with one or more components of the fluid in procedures such as enzymatic reactions; fermentation; ion-exchange and affinity chromatography; filtration; adsorption; chemical catalysis; immunosorption; solid-phase peptide and protein synthesis; and microbiological growth of micro-organisms.

In fluid bed reactors partially solving the problems of packed bed columns, i.e. the problems of suspended matter clogging up the solid-phase bed which increases the back pressures and compresses the bed, disturbing the flow through the bed, the solid phase particles are kept in a free, fluid phase by applying a flow having an opposite direction to the direction of the relative movement of the solid phase particles. Thus, solid phase particles having a density larger than the liquid and moving downwards due to gravity may be kept in a free, fluid phase by an upwards flow of liquid. Also, solid phase particles having a density less than the liquid and thus moving upwards may due to buoyancy be kept in a free, fluid phase by a downwards flow of liquid.

In order to carry out solid phase chemical or physical processes in a fluid bed reactor, an even and smooth distribution of fluid in the fluid bed without back-mixing is often desired. However, fluid bed reactors known in the art do not have efficient means known per se to avoid formation of channels as well as unwanted turbulence and back-mixing in the solid phase particle bed. Especially when the task is to distribute the liquid in large industrial scale reactors (e.g. reactors with cross-sectional areas of more than 0.5-1 $m^2$) it becomes increasingly difficult to obtain a satisfactory distribution of the fluid.

An interesting field of application of fluid bed reactors is EBA.

EBA is an abbreviation for Expanded Bed Adsorption. This is a technology used widely within the biotechnology industries, for example for the production of pharmaceuticals and diagnostic products and in particular for the separation and purification of a broad range of bio-molecules, for example enzymes, proteins, peptides, DNA and plasmids from a vast range of extracts and raw materials, many of which are crude and unclarified. The present invention particularly relates to a new way of introducing the fluid to be processed into an expanded bed adsorption contactor.

The term expanded bed is used to describe a special case of a fluid bed (or fluidised bed) where turbulence or back-mixing of the fluid in the suspended bed of solid phase particles is at a minimum. Another term for this situation is that the fluid passes the expanded bed With "plug flow" and thus resembles the flow pattern in a packed bed wherein turbulence and back-mixing are practically absent.

A traditional purification process for a mixture comprising one or several target molecules could be purification on a packed column (i.e. not EBA), however this requires multiple operational steps such as filtration and centrifugation in order to ensure that impurities in suspension and particulates (for example colloids, whole cells, cell walls, protein aggregates) are removed before the mixture is applied to a suitable packed column. These steps are necessary in order to avoid clogging of the packed column. In the packed column, a given chromatographic medium is present for binding of molecule(s) which are generally the target of the purification, but alternatively can also be used for binding impurities. This chromatographic medium can be adapted to various purification purposes.

The main principle in EBA is to keep the chromatographic medium fluidised and thereby allow particulate impurities, suspended solids and colloidal materials to pass through the column. By using the EBA technology, it is in many instances possible to avoid the above-mentioned operational steps (i.e. those used before packed bed chromatography) before application of the raw material to the column. In this manner, time and expenses for these processes are reduced making EBA a valuable technology, which is economically recommendable for the purification of a large number of different bio-molecules. In addition, productivity and overall yield can be expected to be improved when compared to traditional processing using packed beds.

In order to utilise the EBA technology, an EBA column used to contain a suitable chromatographic medium is required in conjunction with a suitable fluid distribution mechanism.

A brief presentation of the steps generally used in the EBA technology will be given in the following (assuming it is an up-flow process with solid phase particles more dense than the fluid).

1. An adequate quantity of solid phase adsorbent is placed in an EBA column (i.e. the fluid bed rector).
2. Fluid flow through the adsorbent from below is initiated by pumping the liquid to be processed through a fluid distributor. The adsorbent is thereby fluidised (expanded).
3. The adsorbent is rinsed in the column and the conductivity (i.e. salt concentration) and pH are adjusted to what is required to allow binding of the target to the adsorbent.
4. Raw material (i.e. the feedstock) is applied to the expanded bed of adsorbents and the target molecule(s) are bound.
5. The remaining raw material is rinsed out from the column using a wash fluid.
6. The target molecule is eluted off the adsorbent medium by applying a fluid that weakens the interaction with the adsorbent. The elution of the target molecule may be performed after packing the chromatographic adsorbent and reversing the flow direction in the column or the elution may be performed in the expanded bed state.
7. The chromatographic adsorbent is finally (optionally) rinsed and regenerated.

Before the raw material is applied to the column, it should be ensured that expansion of the bed of adsorbent media is stable (i.e. that plug flow like fluid rise is obtained in the column without unwanted turbulence or back mixing of the fluid). The most reliable way of checking seems to be determining the number of theoretical plates by examining the residence time distribution following addition of a tracer. Such methods are well known to those familiar with examining the performance of reactors and particularly to those versed in the art of expanded bed adsorption (for example see the hand book "Expanded Bed Adsorption" by Pharmacia Biotech, Edition AA, page 14; or Levenspiel, O. 1999. Chemical reaction engineering, $3^{rd}$ ed. John Wiley and Sons, Inc. N.Y.). A satisfying total number of theoretical plates in a column indicating a low degree of back-mixing and fluid flow characteristics suitable for an EBA process is generally in the range of 25 to 30 plates or more (see for example "Expanded Bed Adsorption" by Pharmacia Biotech, Edition AA, page 16). In addition, it is generally considered that 50-100 theoretical plates per meter sedimented bed height is satisfactory. Furthermore, visual inspection of the bed particularly using dyes or colored tracers can provide valuable qualitative information about the presence of channels or jet streams in the column. If the solid phase media move only in small circles, channels are not observed and local jet streams of fluid largely devoid of media cannot be seen, this is a good indication that the adsorbent media is expanded in a stable manner.

If an EBA column is not expanded in a stable way and has a plug flow fluid rise, the adsorption efficiency may be low and the whole process economy may be impaired. In analogy, the same will be true for a broad range of other fluid bed and expanded bed reactions not related to adsorption e.g. (continuous) enzymatic reactions and chemical catalysis, chemical synthesis of e.g. peptides and polynucleotides. In these cases, an unstable expansion with turbulence and back-mixing may result in a high loss of unreacted chemical building blocks at the outlet of the column and potentially a slower reaction rate. Also, chemical reaction equilibrium may not be reached or may shifted in an unfavourable direction.

Further information about EBA technology can be found in the book "Expanded Bed Adsorption" by Pharmacia Biotech, Edition AA.

DESCRIPTION OF PRIOR ART

U.S. Pat. No. 4,032,407 discloses a tapered bed bioreactor applying immobilised biological catalysts or enzymatic systems on fluidizable particulate support materials consisting of coal, alumina, sand, and glass, i.e. materials heavier than the fluid, particularly an aqueous fluid.

EP-A-0175568 discloses a three phase fluidised bed bioreactor process comprising purifying effluents in a three phase fluidised bed comprising solid particles being made by mixing a binder with an inorganic material based on aluminum silicate, granulating the resulting mixture, and firing the granules to sinter them. The specific gravity of the sintered granules is adjusted to fall into a specific range from 1.2 to 2.0 by varying the mixing ratio of inorganic powdery materials based on aluminum and binders, said sintered granules having a diameter from 0.1 to 5 mm.

EP-A-70025309 discloses a down-flow fluid bed bioreactor applying biota attached to carrier particles consisting of cork, wood, plastic particles, hollow glass beads or other light weight material and having a specific gravity which is less than that of a liquid sprayed onto the upper part of a fluid bed of suspended carrier particles and conducted downward through the bed.

A disadvantage of distributing an introduced liquid in a fluid bed reactor by simple spraying is the formation of channels in the bed by fluid streams.

EP-A-0005650 discloses an up-flow fluid bed reactor having fluidising liquid flow distributors at the bottom thereof providing flow paths to avoid turbulence effects. Besides requiring complicated flow paths, a great disadvantage of such a distributor is that it may be clogged by particulate matter.

EP-A2-088404 discloses a fluid bed reactor system for catalytic polymerisation of olefin monomers composed of a cylindrical reaction vessel equipped with distribution plate and agitator disposed in the fluidised bed above the plate and adapted to cause a rotational flow in the fluidised bed, said distribution plate having many passage holes each covered with a cap having an opening the direction of which varies with the distance from the centre of the plate and faces the same direction as the direction of the rotational flow. The fluid bed reactor system is intended to reduce various troubles such as blocking of the distribution plate, formation of polymer agglomerates, and stagnation, adhesion, and agglomeration of polymer at the caps.

EP-A1-0007783 discloses a control system for preventing accumulation of excessive cellular material in a fluidised bed reactor comprising a separator column having means to effect shearing of excess cellular material from the particles to produce in the column a mixture of sheared material and partially stripped carrier particles, said carrier particles being returned to the bed while the sheared material is discharged from the column through the draw-off port. In a specific embodiment the shearing is effected by an agitator arrangement comprising a motor-driven mixing blade operating within the lower portion of the separator column; to rotary speed of the mixing blade being adjusted to an optimum degree of shear for the cellular growth. Excessive pulverisation of the sheared material is avoided by using not a too high rotary speed.

Patent Abstract of Japan, Vol. 8, No. 162, C235 (Abstract of JP 59-62 339) discloses a vertically movable agitator for gas fluidisation equipment to obtain an effective treatment of powder and granules.

EP-A2-0243845 discloses a fluid bed having a built-in device in form of a perforated plate and/or net for performing gas-solid phase reactions whereby generated voids are destroyed so that a homogeneous fluid bed without large voids is provided.

DK/EP 0538350 T3 discloses chromatographic adsorption particles having covalently bound thereto at least one active substance for binding of molecules in a liquid chromatographic fluid bed process. These adsorption particles are formed of a porous composite material with pores permitting access for the said molecules to the interior of the composite material. The spheres can be produced having a given density and diameter. The density is controlled by incorporation of one or more inert particles in the chromatographic medium, the number, material and percentage of the inert particles being significant for the ultimate density of the chromatographic medium. In additions, the pore size can be controlled. The density controlled particles can be viewed as inert heavy/light particles coated with a hydrophilic layer, a conglomeration compound such as an agarose layer of different concentration and thus pore size.

The book "*Expanded Bed Adsorption*" by Pharmacia Biotech, Sweden, discloses that the size and density of the individual sphere at a given flow situates the sphere at a specific position in the column. The small and light spheres will move to the upper part of the expanded matrix while large, heavy particles will move towards the lower part. The result is that the particles settle at their ideal position after a suitable period of time. When this has taken place, expansion will be stable.

DK/EP 0538350 T3 further discloses a liquid bed reactor as a down/upflowing liquid fluid bed reactor comprising a vertical reactor container with an inlet, an outlet, a fluidised particle bed of chromatographic adsorbent particles and means for initiating movement which are located near by or in the fluidised particle layer which is closest to the liquid inlet. There is a mixed zone, i.e. a stirring zone, the size of which is determined by the degree of stirring, the liquid flow and the quantity of matrix in the reactor container. Above/below this zone is a non-mixed zone in which a so-called plug flow is achieved. By the term plug flow is understood a movement of the liquid as a band through the container and consequently also through the matrix.

An example of such a reactor container is an UpFront column 20™ which is an up-flow reactor developed by UpFront Chromatography A/S, Copenhagen, Denmark.

This reactor container is constructed in such a manner that a supporting net with a pore size of 50 μm is located at the bottom. Below the supporting net is an outlet/inlet which is primarily used as an outlet during elution. A motor axis on which a stirrer is secured extends down the middle of this net. The rate of the stirrer can be varied. Stirring only occurs when the flow comes up through the column. During elution the stirrer is stopped. Right above the supporting net a side inlet is located. Here, all liquid is supplied when the matrix is to be and has been fluidised. This inlet can be opened and closed by siding the inlet valve into or out of the column pipe. The column pipe is a borosilicate pipe of 20 mm. The actual inflow takes place through four round openings with a diameter of 3 mm each located in that part of the inlet valve which is inside the column pipe. The valve is closed at the end and the four round openings are distributed in the same cross-section in two axes placed at an angle of 90 degrees to each other. The column pipe is 50 cm long (high) and on its side is a scale so as to enable reading of the expansion of the matrix at any time. In addition, the column is provided with a float adapter, an UpFront float, which provides a gentle and good distribution of the elution buffer during (down flow) elution. At the top is an outlet/inlet. Every inlet and outlet is provided with valves on which suitable hoses are mounted. Buffer and raw materials are pumped into the column at an even flow. Typically, the matrix will be ⅓ of the column height. In this case, it is possible to up expand the bed to 3 times. Depending on the type of particles/matrix applied, the flow can vary from 6 column cm/min to 900 column cm/min.

The stirring zone varies from 2-20 cm. In this application the term stirring zone is to be understood as exactly the height in the column at which a stirring of liquid and matrix occur. The viscosity and flow of the liquid and the stirrer's design and rate are significant for the extent of the zone. In addition, it is important that the column is plumb (i.e. vertical). This concept can also be scaled-up to a larger column diameter.

WO 95/20427 discloses a construction for adsorption/desorption of a substance where liquid can flow through a column of matrix. This construction comprises: a) a bottom adapter which is located at the bottom part of the container. The bottom adapter defines the bottom. The adapter has an opening in the bottom for inflow/outflow of liquid to and from the bottom part of the container. This adapter also has a distribution function. It creates the back pressure necessary to create plug flow; b) a top adapter which is located at the top part of the container. This adapter has an opening pointing towards the bottom for inflow/outflow of liquid to and from the top part of the container. It also has a distribution function. This upper adapter has a density permitting that it floats on the liquid passing through the container. By means of hoses, both adapters can lead liquid to and from the container depending on the direction in which the liquid should flow.

Pharmacia Biotech has developed an EBA column which distributes the liquid in another way than by stirring. In the bottom of the column there is an inlet/outlet. Above the column is a distribution plate through which the liquid has to pass to enter the column. The distribution plate creates the pressure drop necessary to create a plug flow. By the term plug flow is understood the movement of the liquid as one front through the matrix. This bottom adapter leads the liquid vertically upwards through the column. The top adapter can be positioned anywhere necessary in the column. In this manner head space can be reduced. By the term head space is understood the liquid above the matrix.

A serious technical problem in connection with EBA columns using a distribution plate through which the fluid to be processed must pass, is fouling. This is particularly problematic when feedstocks containing for example, whole cells, disrupted cells, particulates, nucleic acids or colloidal materials are present and can lead to blockage of the distribution plate. Another further technical problem is that the distribution plate must have hole sizes small enough to prevent ingress of the solid phase support medium into the fluid distribution mechanism when fluid flow is stopped. This severely limits the lower size of solid phase supports that can be used for fluid treatment.

Although problems of fouling might be addressed by using larger (relative to those in a perforated plate distributor) fluid inlet ports in the column base or radially on the column wall and a local mixer to distribute the fluid, a serious technical problem in connection with such known EBA column using a stirrer is that when the column is scaled-up, scale effects begin to play a dominant role. This is most easily recognised by the presence of dead areas/volumes, i.e. areas/volumes where the solid phase medium is not properly contacted with the fluid to be treated. This can lead to channels in the expanded bed and serious reductions in process performance as well as difficulties for cleaning in place and support regeneration. In addition the ability to create a small, localised, well-mixed area in the bottom of a column in the vicinity of the fluid inlet port(s) becomes increasingly difficult as column diameter is increased.

BRIEF DESCRIPTION OF THE INVENTION

Thus, it is an aim of the present invention to provide a system and a method at least seeking to solve the problems of using a stirring device to distribute fluid entering through large ports on the column wall or base. Consequently, the present invention provides a fluid bed system for use in treating a fluid by contacting the fluid with a solid phase medium, in a system which, in a first aspect, comprises:

- a reactor chamber having an upper end and a lower end and to contain the solid phase medium; and
- at least one fluid distribution means adapted to distribute and/or deliver the fluid to be treated among the particles of the medium.

In particular preferred embodiment, the distribution means deliver(s) and distribute(s) the fluid to be treated through a rotating distributor without the need for significant stirring or mixing and which is placed among the particles of the medium.

In accordance to the aim of the present invention, preferably for fluid bed and expanded bed columns, said distribution system uses preferably large fluid outlet holes compatible with foulants and which preferably avoids generation of dead zones and which preferably provides even fluid coverage of the cross sectional area of the column so that a plug flow, or substantial plug flow, like fluid rise is developed in the column.

According to the first aspect of the invention the fluid bed system utilises, a distribution means preferably specifically designed to simultaneously deliver and distribute the fluid to be treated among the particles of the medium without the need for significant mixing. Thereby the present invention differs from prior art fluid bed system as all known fluid bed systems deliver the fluid to be treated to the medium at the column extremities. By applying the fluid to be treated at the column extremities, the fluid must subsequently be distributed to the interior of the bed of solid phase media to achieve a satisfactory flow profile in the column and to ensure a good contact between the solid phase media and the fluid to be treated.

Design of a fluid distribution device to fulfil the aims stated above has been particularly difficult, especially when the column is scaled-up, as in many of the prior art distribution devices, the transportation of the fluid occurs often in the main part by the action of the stirrer.

BRIEF DESCRIPTION OF THE DRAWINGS

In the following, the invention, and in particular preferred embodiments thereof, will be described in connection with use in an up-flow expanded bed adsorption column of 150 cm diameter and in connection with the accompanying drawings and pictures in which:

FIG. 7a shows in details attachment of the intermediate part (45) by the use of the bolts (44) to the column base part. The presence of the lip seal (not seen in the figure) between the intermediate part fixed to the column base and the circular base part (30) of the distributor permits the distributor to rotate whilst at the same time preventing fluid loss from the chamber or support ingress into the chamber.

FIG. 14 shows a close-up of the edge of the column and discloses how the fluid comes out from the distributor in a jet down to the base plate, sweeping the matrix off the column bottom and removing dead zones underneath the distributor.

FIG. 15 shows the distributor according to the present invention arranged in the column. The distributor is rotating with 4 rpm. As can be seen there are no discrete zones of clearing evident in FIGS. 10-14 since the fluid is being distributed evenly over the column base by the slow rotation of the distributor.

Figure 1:
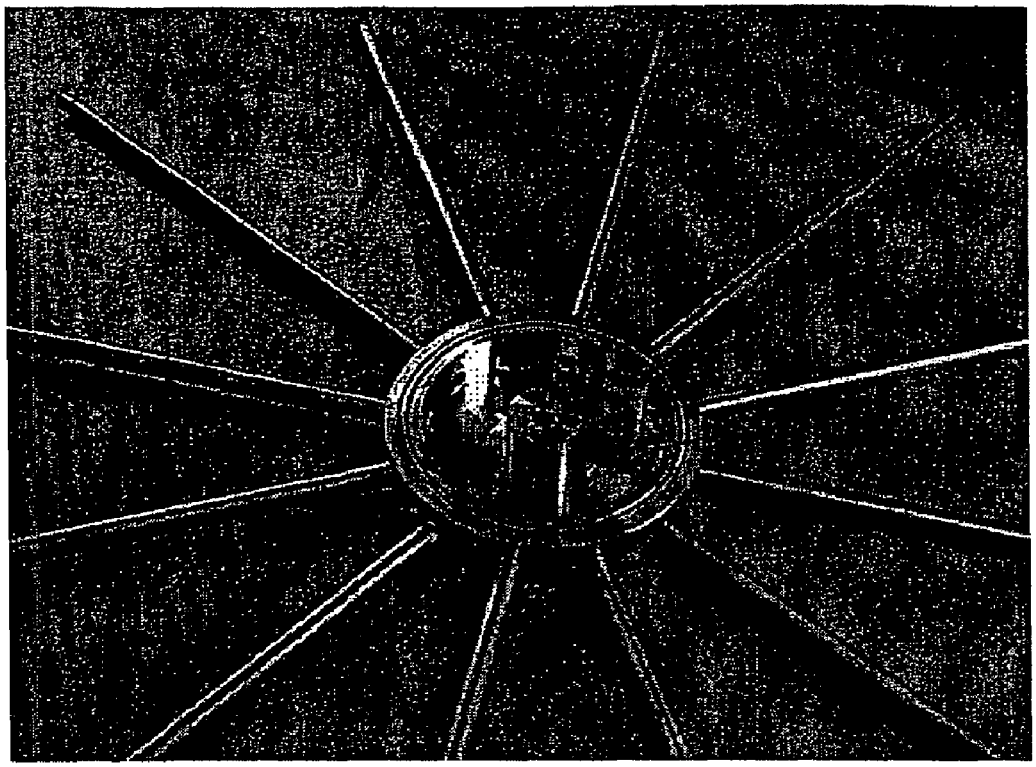
FIG. 1 shows a close-up photograph of the distributor (the distributor is shown upside down), FIG. 2. shows a further close-up photograph of the distributor (upside down) shown in FIG. 1, the distributor blades and the fluid outlet holes through which fluid passes from the distributor and into the column is shown.
Figure 2:
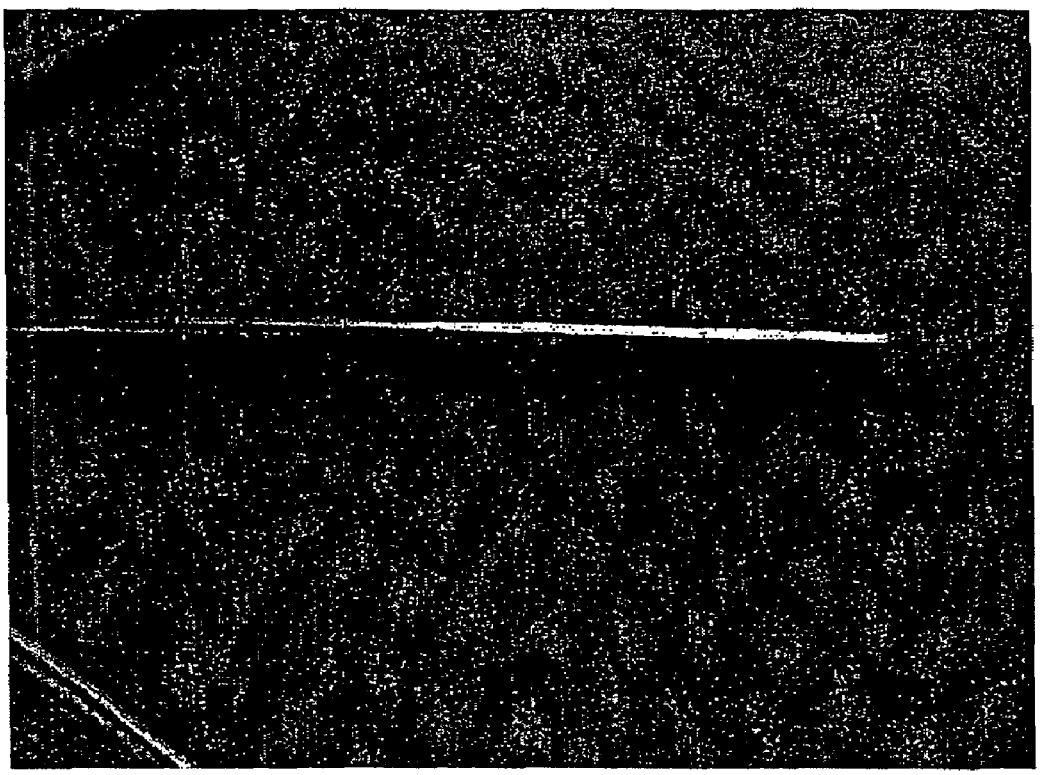

Table 1 show examples of the use of the present invention. Bed voidage was determined based on expanded bed height and assuming settled bed voidage of 0.4. The voidage was then used to calculate the interstitial fluid velocity based on the observed time taken for tracer to pass through the column or the rate of dye band movement at the wall (see FIG. 30). The theoretical velocity was determined based on the expected time for a tracer to pass through the bed given the voidage, volumetric flow rate (5000 L h$^{-1}$) and expanded height. Values for interstitial fluid velocity observed, are averages and standard deviations of n separate experiments.

Table 2 shows examples of the use of the present invention

GENERAL DESCRIPTION OF THE INVENTION

Referring to the accompanying figures the general principle of the fluid distributor system according to the present invention will now be described. As stated in the introduction to the invention, columns considered herein are in general defined by at least a reactor chamber, typically being tubular shaped, limited at the lower end by a bottom part and limited at the upper end by a top part. Inside the reactor chamber a solid phase medium is placed together with a fluid for fludisation of the bed. The fluid to be treated is caused to flow through this medium by the distributor. The medium is considered to be a solid phase medium in the sense that the medium is insoluble (or substantially insoluble) in the fluid to be treated and the medium can be impermeable or permeable to the fluid to be treated.

According to the present invention, the fluid to be treated is delivered and distributed through a rotating device placed amongst among the media particles. This is believed to be a novel and inventive feature which provides for a very efficient treatment of the fluid since the flow properties desirable in the column for expanded bed adsorption are developed.

In the preferred embodiment of the invention, the delivery and distribution of the fluid to be processed is performed by a distributor comprising a number of outlet holes for release of the fluid to be processed from inside the distributor to the solid phase media. These inlet holes are distributed in a plane (or planes) being perpendicular to the longitudinal axis of the tubular shaped reactor chamber, which plane(s) is(are) situated in the vicinity of the bottom part of the reactor chamber in the case of an up-flow type reactor. In the case of a down-flow fluid bed reactor type, the plane (or planes) is(are) situated in a distance (in distances) from the top part of the column—or below the free surface of the fludising liquid. In all cases the inlet holes are below the free surface of the fluid.

Furthermore, in case of an up-flow type reactor these holes are arranged so the fluid is delivered/distributed to the medium in a direction being towards the bottom part, such as being downwardly inclined, for example being inclined 45° downward with respect to the horizontal, preferably being inclined 90° downward with respect to the horizontal,—or in general in a direction being opposite to the direction of the main flow direction (defined by the direction of the volume flow) inside the reactor chamber. In the case of a down-flow fluid bed reactor type, the fluid is typically inlet perpendicularly to the main flow direction and tangentially to the periphery of the reactor chamber.

Even though the distributor shown in the preferred embodiment of the invention is adapted to be rotated, rotation of the distributor may not be carried out if so desired. In such situations, design of the distributor may be done without paying attention to such a requirement and the distributor may the be given any desired shaped. For instance, the distributor may be designed as a grid made by tubes with holes for delivery/distribution of the fluid.

The fluid to be treated is according to the present invention in general, pumped out of the holes in the distributor and into the column among the media by use of a fluid feeder system.

In the prior art systems the fluid is typically inputted to the column through inlet ducts provided in the bottom/top part of the column and the fluid is typically distributed to the medium by agitating the medium by use of a stirrer.

In other prior art systems, the fluid to be treated is inlet to the column through a distributor plate arranged so the fluid is distributed across the cross sectional area of the column under the distributor before flowing into the column, i.e. before the fluid contacts the medium.

Compared to these prior art systems a very well defined and controlled distribution and delivery of the fluid is obtained by the present invention as the fluid flows out of the holes (which may be placed in a defined pattern) in the distributor among the particles of the solid phase medium. Since the hole pattern can be pre-defined the risk of having dead regions in the medium is minimised. Furthermore since the size of the diameter of the holes may be pre-defined, the risk of fouling or clogging of the outlet holes is drastically reduced when compared to prior art systems using perforated distribution plates. In addition since the direction of the outlet holes and the hole size may be predefined, for example directed downwards, and the diameter of the delivery tubes radiating from the central chamber of the distributor amy also be predefined, ingress of the solid phase medium into the distributor (for example when the fluid flow is stopped) can be controlled. This provides the possibility of using a wide variety of diameters of solid phase media. Furthermore, the distribution and delivery of the fluid to the medium may be enhanced by rotating the distributor. Primarily this serves the purpose of distributing the fluid evenly across the cross sectional area of the column With only a minimum agitation of the solid phase medium. The second effect may be obtained by setting the rotational speed of the distributor so that turbulence is not generated.

DETAILED DESCRIPTION OF PREFERRED EMBODIMENTS OF THE INVENTION

In the following a preferred embodiment of the present invention will be described in detail using the example of a distributor constructed for an up-flow expanded bed adsorption column 150 cm in diameter.

In FIGS. 1-4 the distributor is shown upside down and out of the column. The distributor 10 comprises a number of elongated tubes 20 (in the preferred embodiment the distributor has twelve such tubes) evenly distributed along the periphery of a circular shaped base part 30. Each tube 20 is hollow. Furthermore, each tube 20 has holes 22 enabling fluid flow, at least, out of the tube 20. Please note that the holes 22 are provided so that fluid exiting the tubes through these holes 22 will be directed downward when the distributor is situated in the column (the distributor pictured is shown upside down). In the preferred embodiment the tubes 20 also have at least one hole 22 provided at the distal end, which releases some of the fluid in a direction preferably being in the longitudinal direction of the tube 20 and also directed downwards, to sweep the corner of the column base plate and Wall.

The tubes 20 according to the preferred embodiment have circular cross sections, but the tubes 20 may be manufactured in other shapes. Since in the preferred embodiment it is desired to minimise mixing and turbulence create by distributor rotation, and only to distribute the fluid over the cross sectional area of the column, the tubes 20 may be given a shape so as to avoid mixing when rotated, for example a thin knife-like shape or a tear-drop shape. If for some reason it is desired to obtain mixing, the cross sections of the tubes may be aerodynamically shaped, i.e. shaped such as to provide lift and drag to move the fluid and or the solid phase support. Furthermore, the tubes 20 may be inclined downward with respect to the horizontal to modify the fluid flow within the column.

Figure 16:
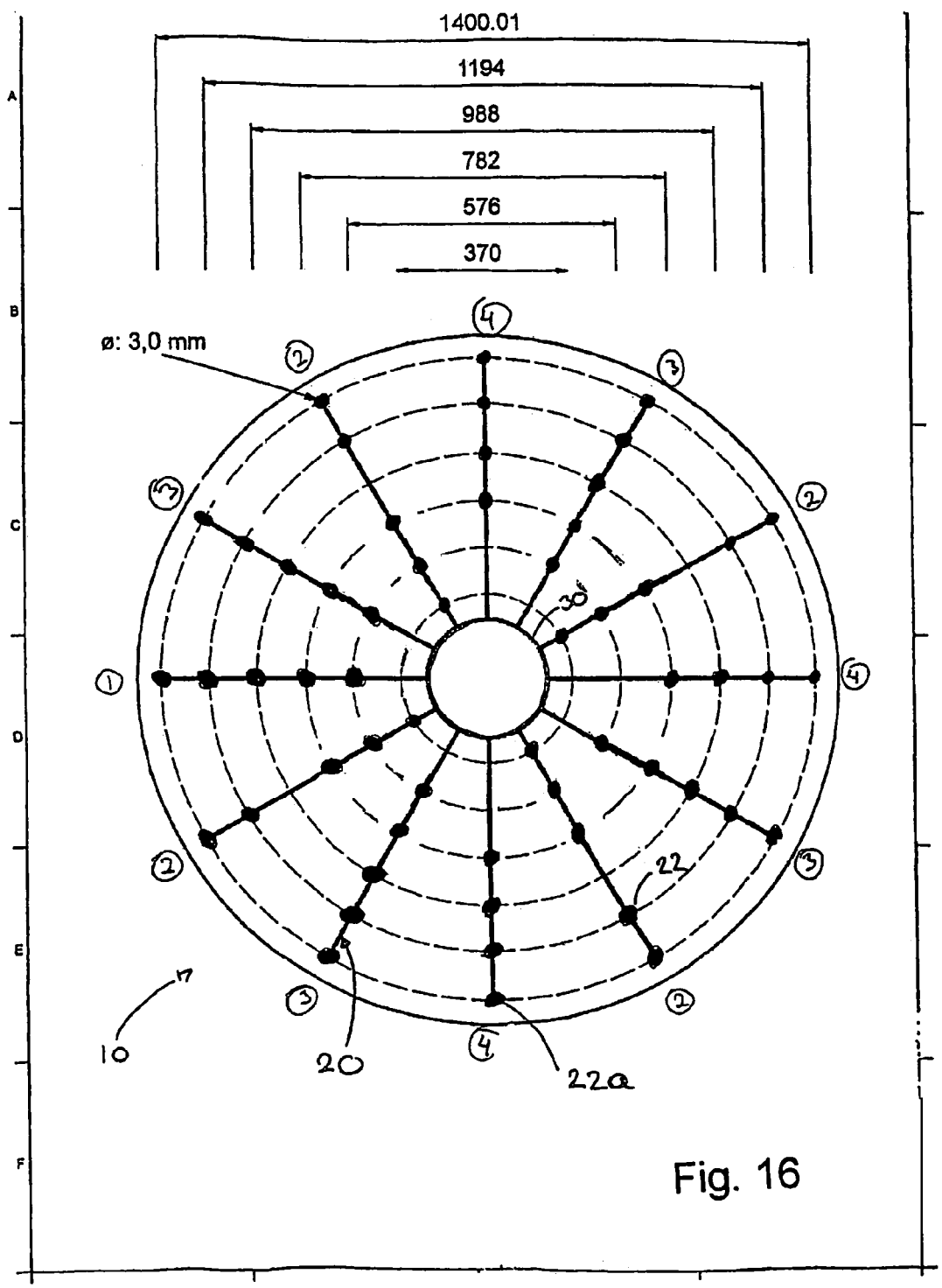
FIG. 16 shows schematically one variation the distributor according to the present invention.
Figure 17:
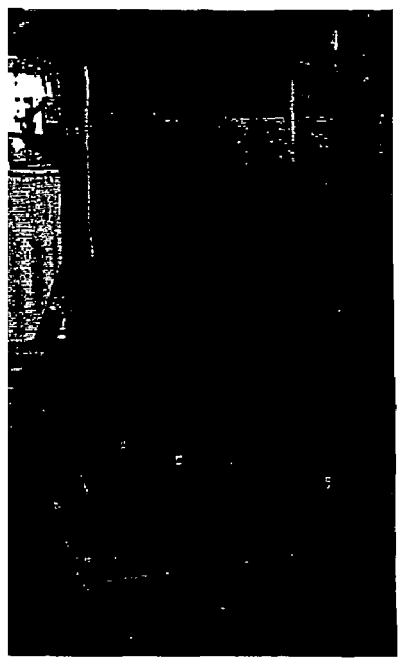
FIGS. 17-20 show examples of use of the present invention.
Figure 18:
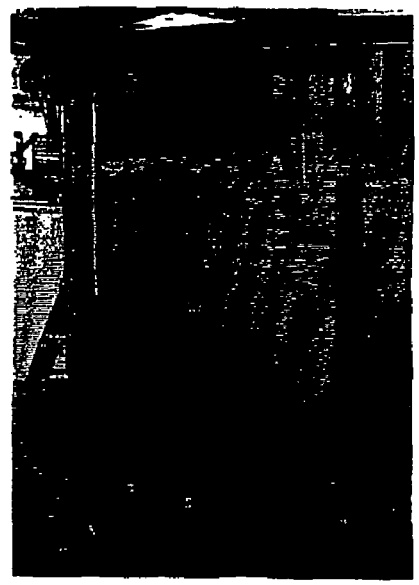
Figure 19:
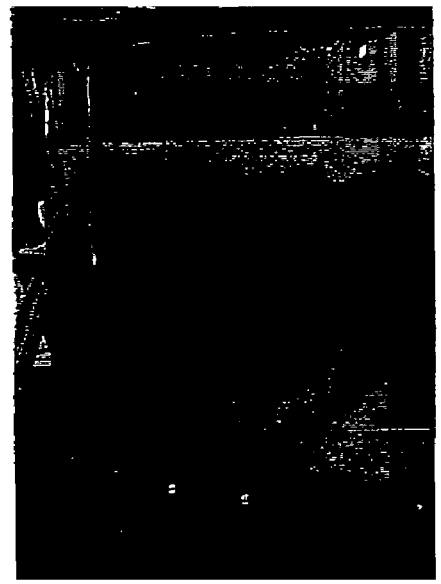
Figure 20:
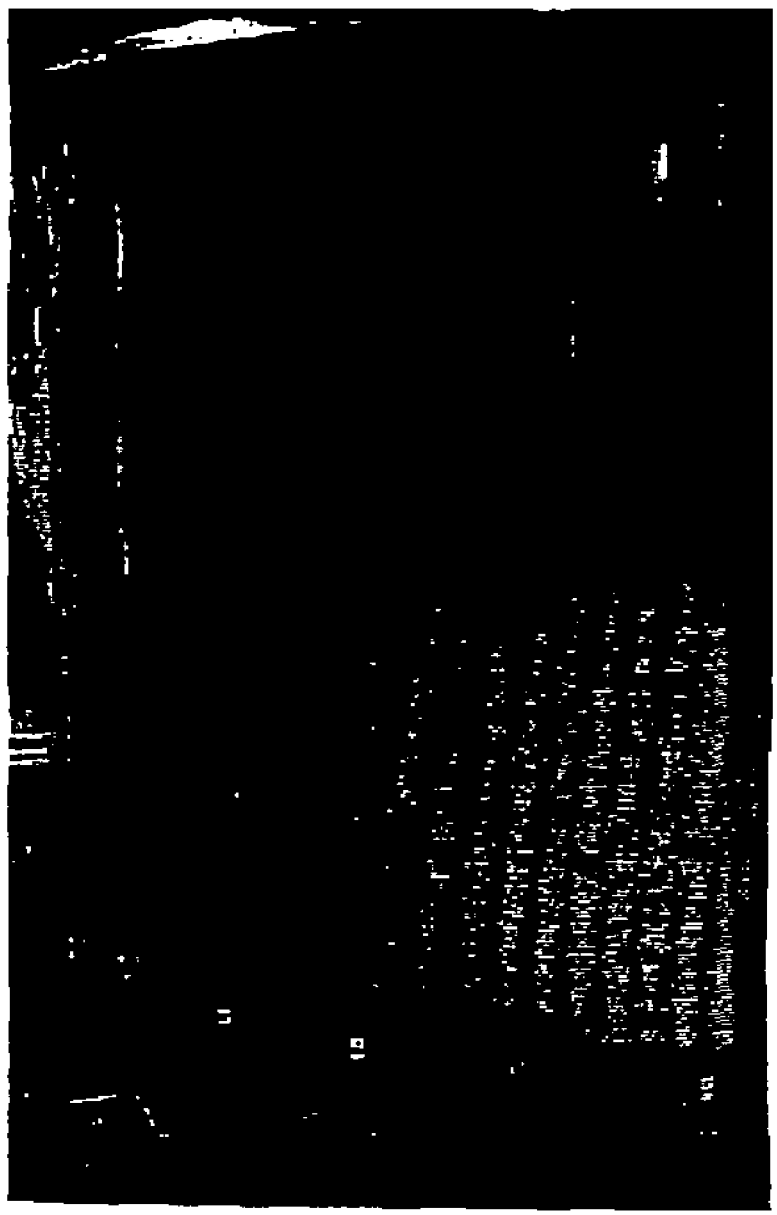

In FIG. 16 the distributor 10 is depicted schematically. The elongated tubes 20 are sketches with thick lines and the holes 22 are indicated by filled circles. The thin and broken lines indicate that the distributor 10 is circular and symetrical. Furthermore, the physical dimensions of the distributor 10 are indicated, for instance the exterior diameter of the distributor is indicated to be approximately 1400 mm and the diameter of the holes 22 are indicated to be 3 mm.

From FIG. 16 it is realised that the tubes 20 are identical and evenly distributed around the circular shaped base part 30, but having different longitudinal distributions of the holes 22. As indicated (by numbers in circles placed at the distal end of the tubes 20) in the figure, four different longitudinal distributions of holes 22 are applied to the elongated tubes 20. The distribution of the holes are done so as to obtain an even distribution/delivery of the fluid among the particles of the medium and particularly an even distribution of fluid over the cross sectional area of the column base. It can however be envisaged that alternative hole diameters and hole placements might be used.

The holes 22a placed at the distal ends of the tubes 20 direct the fluid in other directions than the holes placed along the tubes. More specifically, these holes 22a whereof one is applied to each tube 20 are arranged/shaped so that the fluid is directed in a direction being aligned with the longitudinal direction of the tube 20 but in the preferred embodiment of the invention the hole is directed at an angle downwards towards the base plate.

Figure 3:
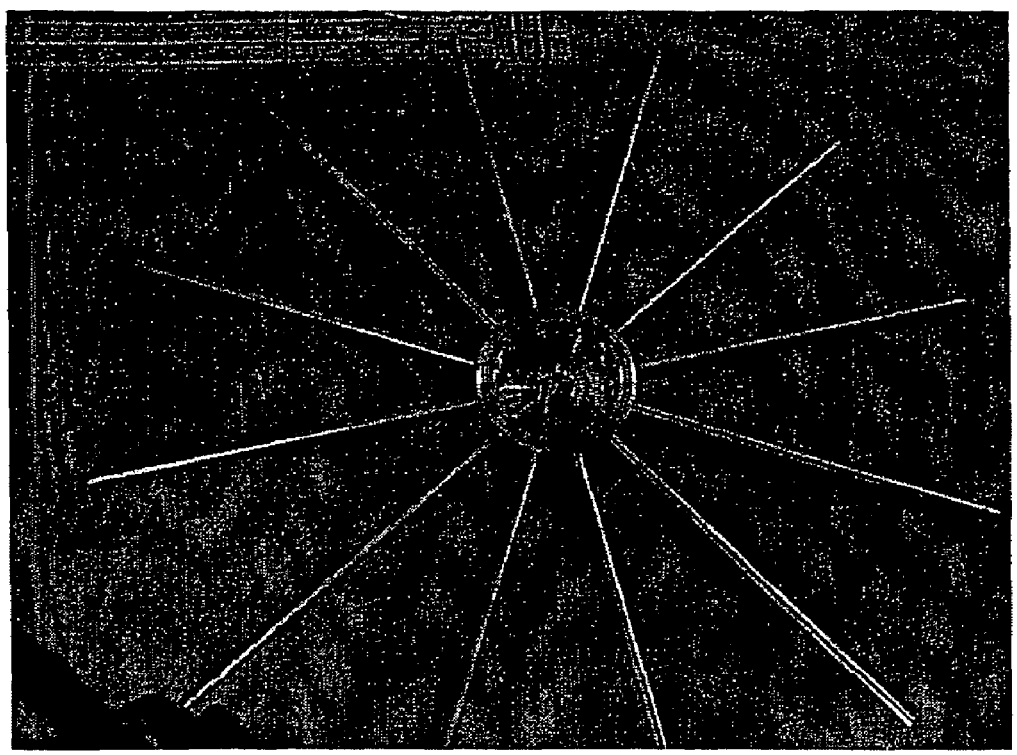
FIGS. 3 and 4 show the distributor of FIGS. 1 and 2 (upside down).
Figure 4:
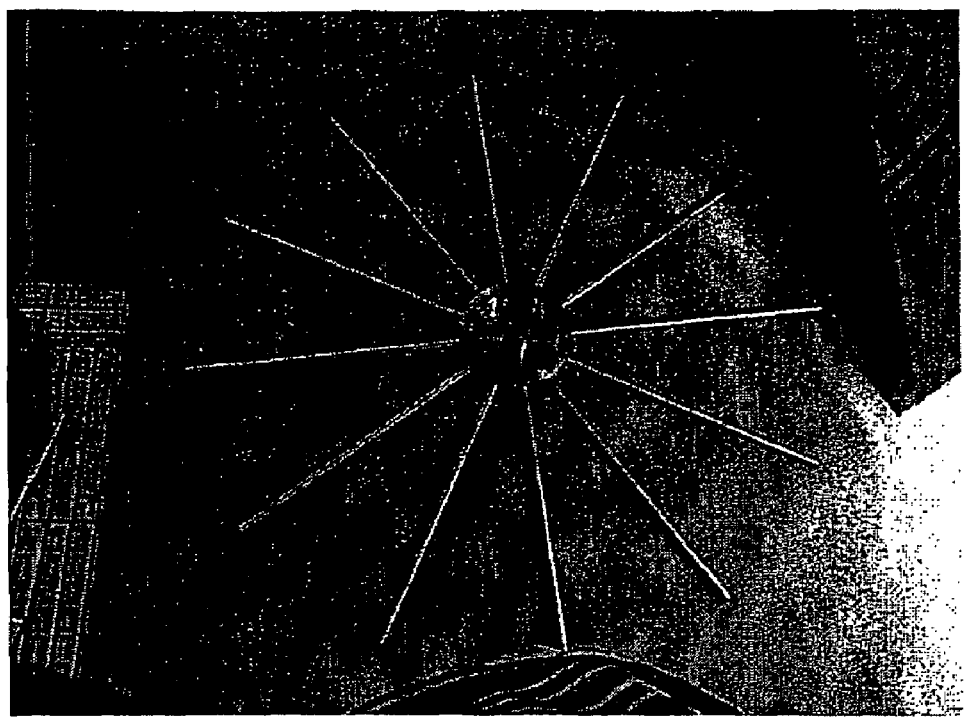
Figure 5:
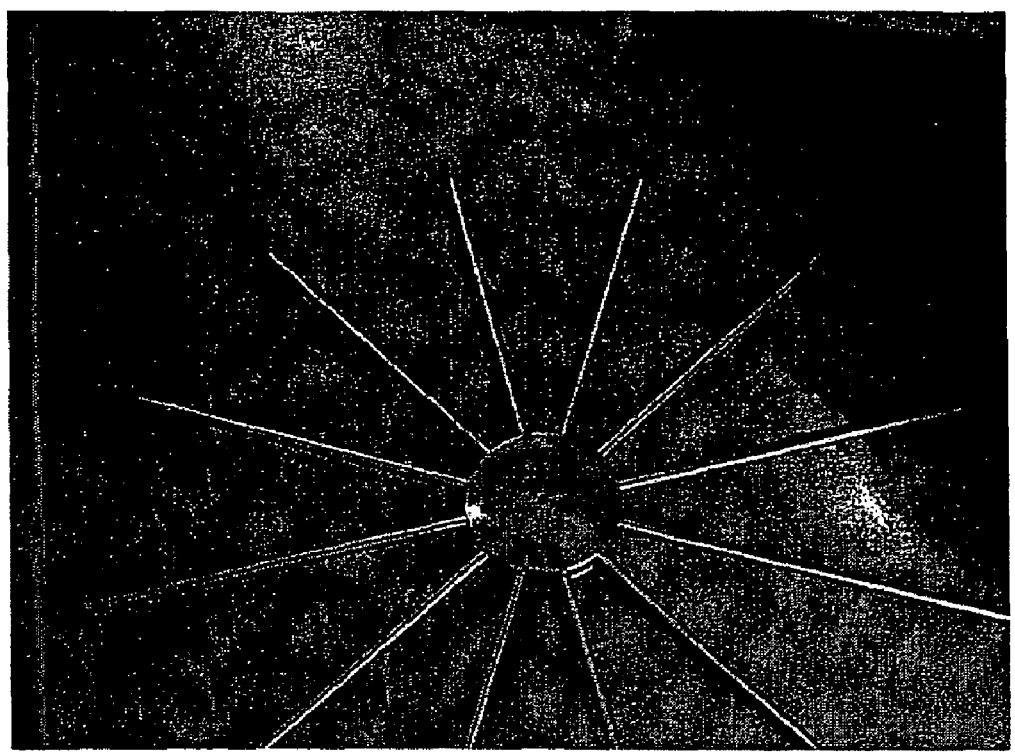
FIG. 5 shows the distributor of FIGS. 1-4 (the distributor is shown upside up), i.e. in the orientation used for an up-flow column.

In FIGS. 1, 3 and 4 it can be seen that the circular base part 30 comprises a cavity 32 (the purpose of which will be described in detail below) which the tubes 22 open into. At the centre of the circular base part 30 a shaft 34 is provided, which shaft 34 adapted to link with a driving shaft 40 for turning the distributor 10, if such turning is desired.

In the base part of the column, in which the distributor is intended to be used, the driving shaft 40 for driving the distributor is located. Furthermore, a single fluid inlet 42 of a fluid feeder system is provided in the base part of the column. In the preferred embodiment of the invention, this fluid feeder system is a single pipe containing a fluid non-return valve (preventing back flow of fluid). This fluid feeder system is the device which feeds the fluid to be treated (in the column) into the distributor 10. During use, the feeder system is connected to an external fluid source and the fluid is is preferably transported through the feeder system by use of a pump appropriate connected to the fluid feeder system. However it can be envisaged that in a variation of the invention, fluid may enter the cavity 32 through more than one fluid inlet 42 connected to one or more fluid feeder systems.

After the fluid leaves the fluid inlet 42 it enters into the cavity 32 and is distributed to the elongated pipes 20 and is finally delivered and distributed among the particles of the solid phase medium through the holes 22. In the preferred embodiment, the fluid enters the cavity 32 asymmetrically. In order to avoid uneven distribution of the fluid to the tubes (20), in the preferred embodiment shown here, the cavity 32 has a small volume leading to a high pressure of fluid within the cavity and within the tubes 20 so that the volume of fluid flowing out of the holes in the tubes 20 is substantially even. In a variation of the distributor it can be envisage that the fluid to be added to the distributor may be applied through the central drive shaft.

Figure 6:
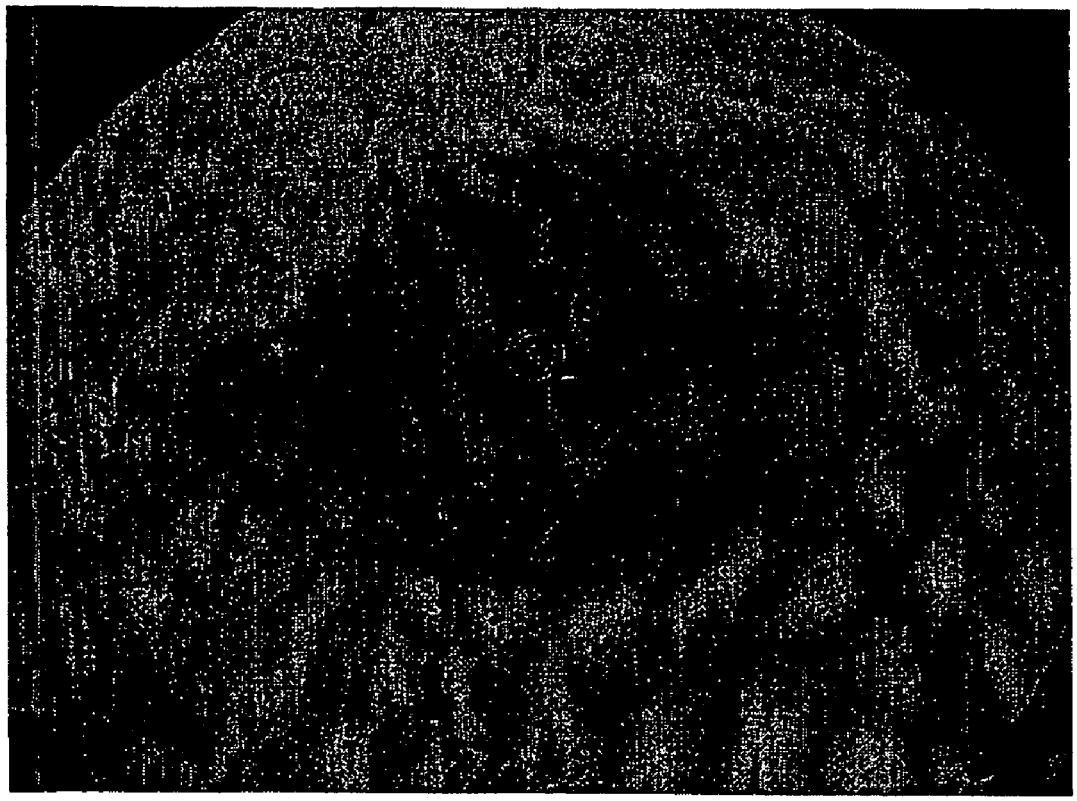
FIG. 6 shows the base part inside of the column.
Figure 7:
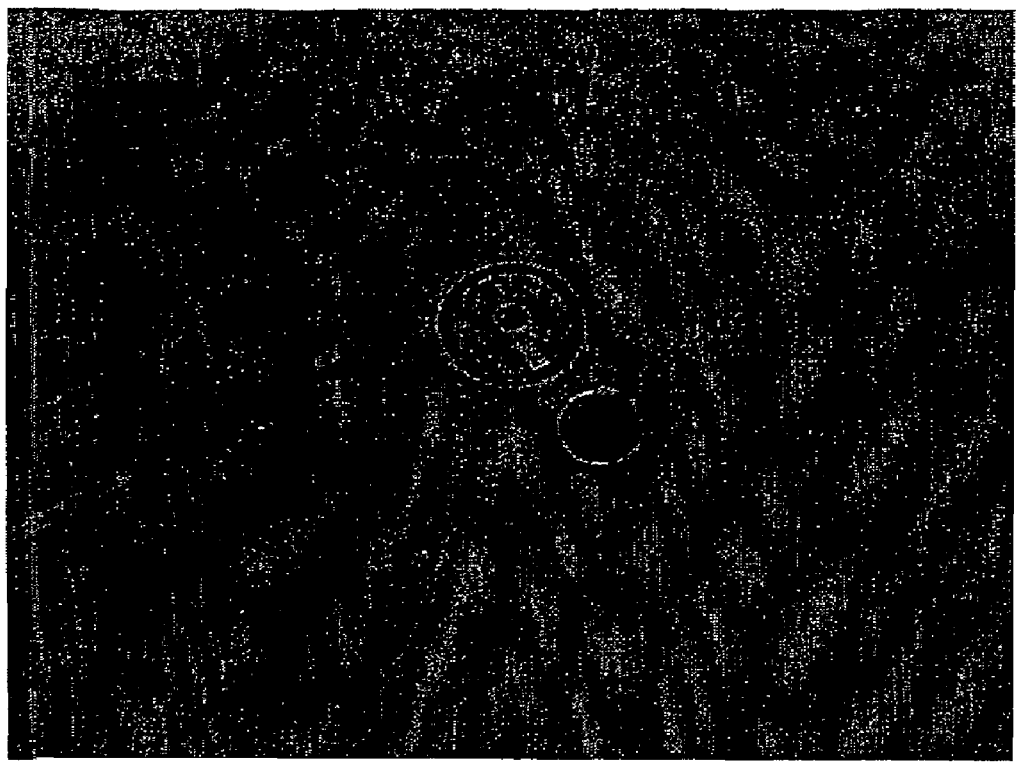
FIG. 7 shows a close up photograph of the base part of the column of FIG. 6 and more particular a close up of where the distributor fits on to the drive mechanism used to rotate the distributor, and the hole connected to the fluid feeder system through which the fluid to be treated comes into the central chamber of the distributor before passing along the distributor blades and out into the column.
Figure 7A:
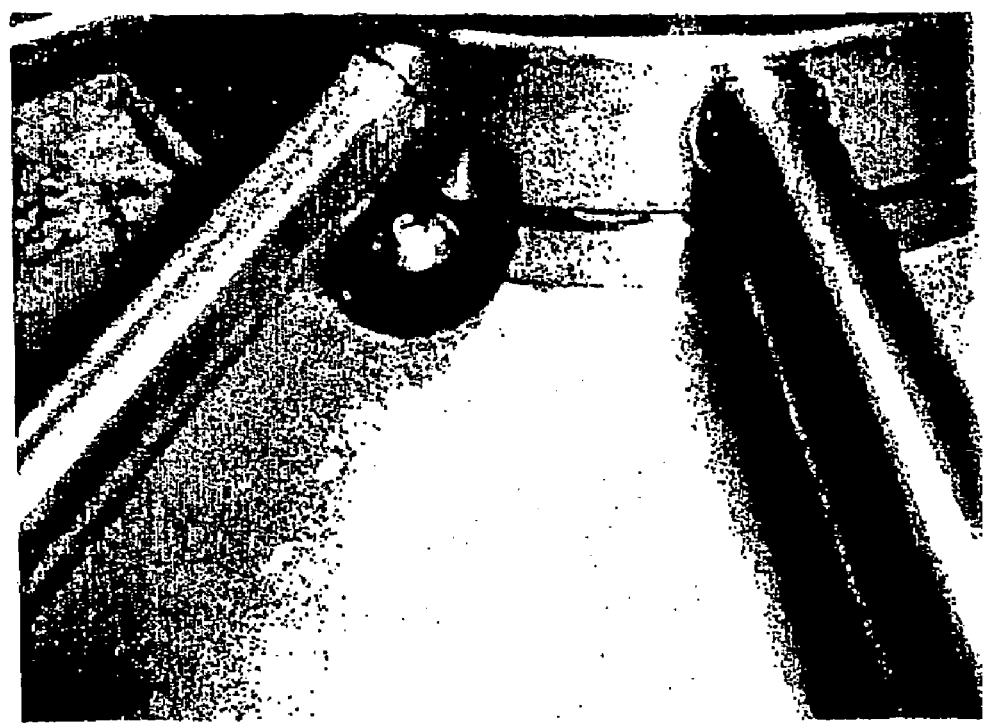
FIG. 7a shows a close up photograph of the intermediate part used to fix the distributor to the column base, yet allow its rotation.
Figure 8:
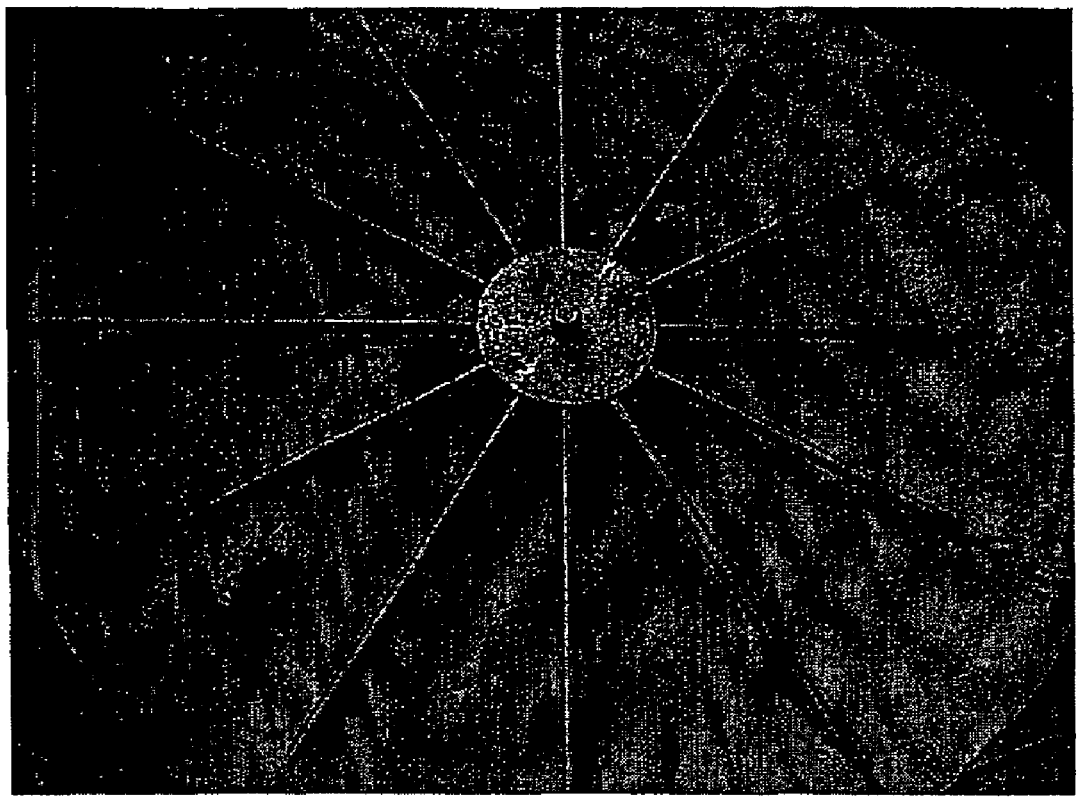
FIGS. 8-15 show the distributor according to the present invention arranged in the column with about 2 cm of gel (solid phase medium) in the bottom. The distributor isn't turning. Furthermore, the figure shows the zones of clearing caused by the fluid jets (water in the present case) moving the solid phase support off the surface of the column base. The volumetric fluid flow rate in FIG. 8 is 2000 L/h and is 5000 L/h in FIGS. 9-15.
Figure 9:
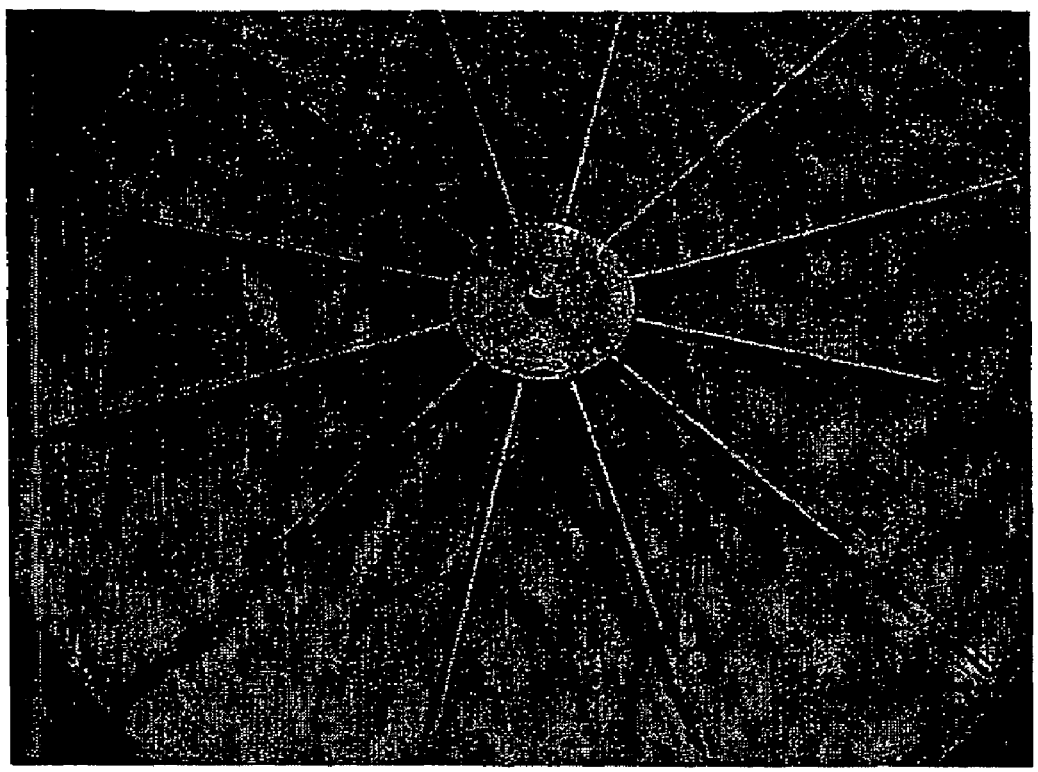
Figure 10:
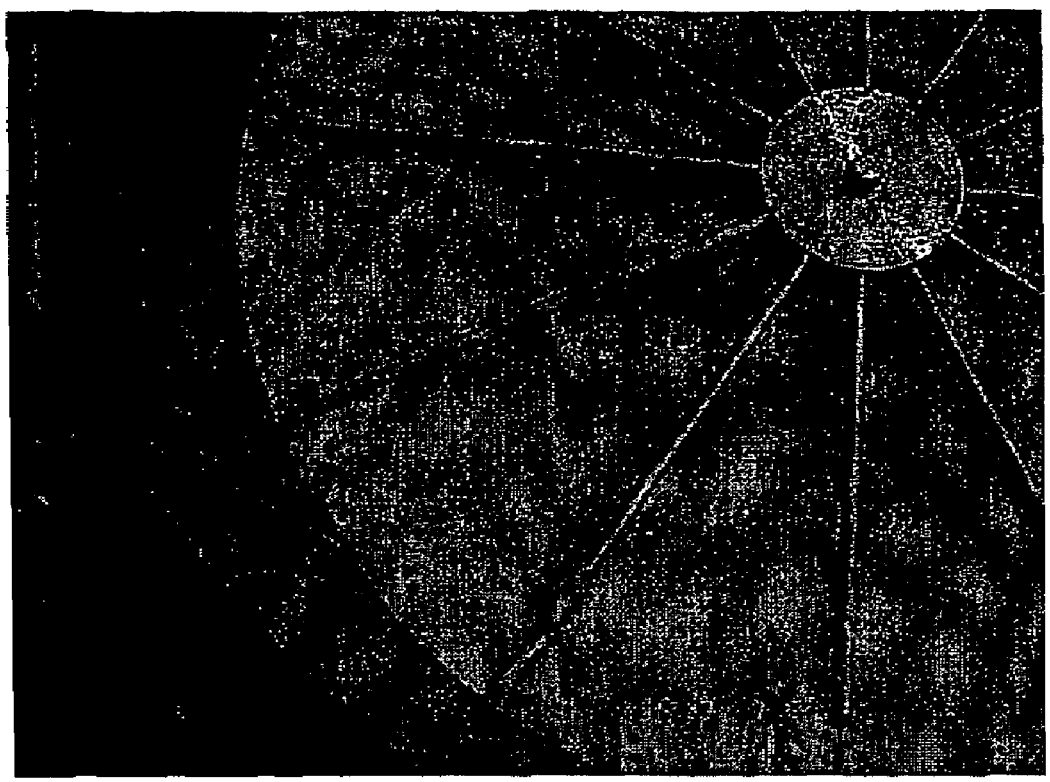
Figure 11:
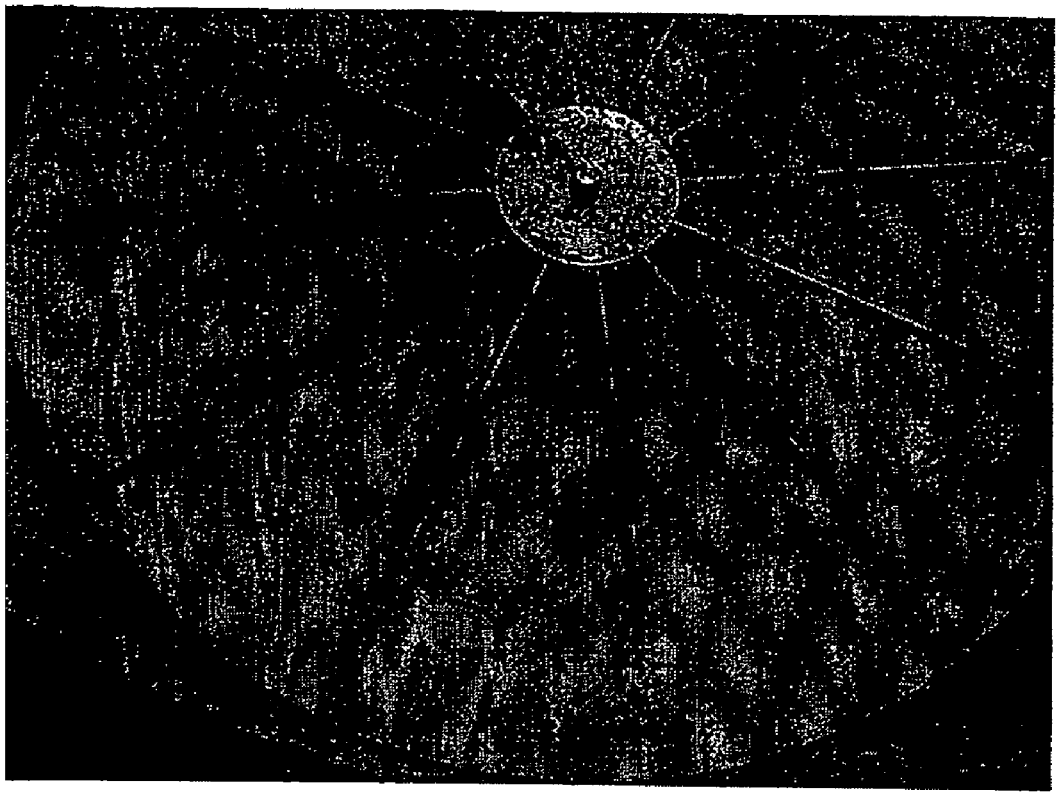
Figure 12:
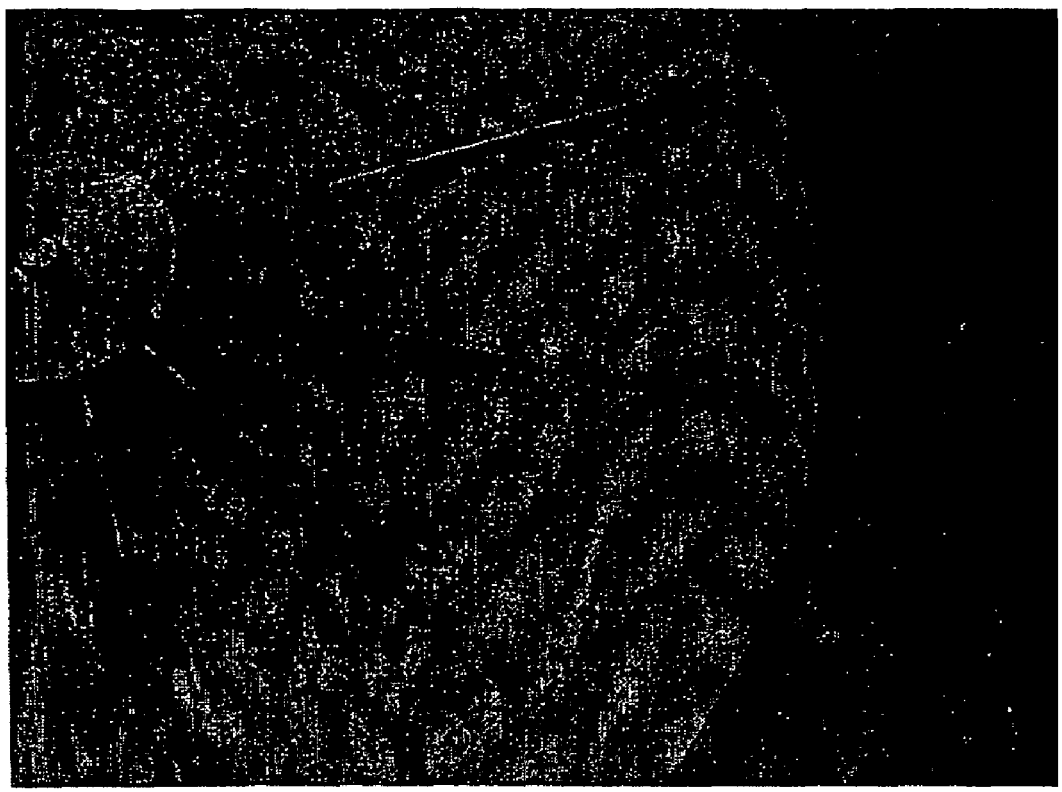
Figure 13:
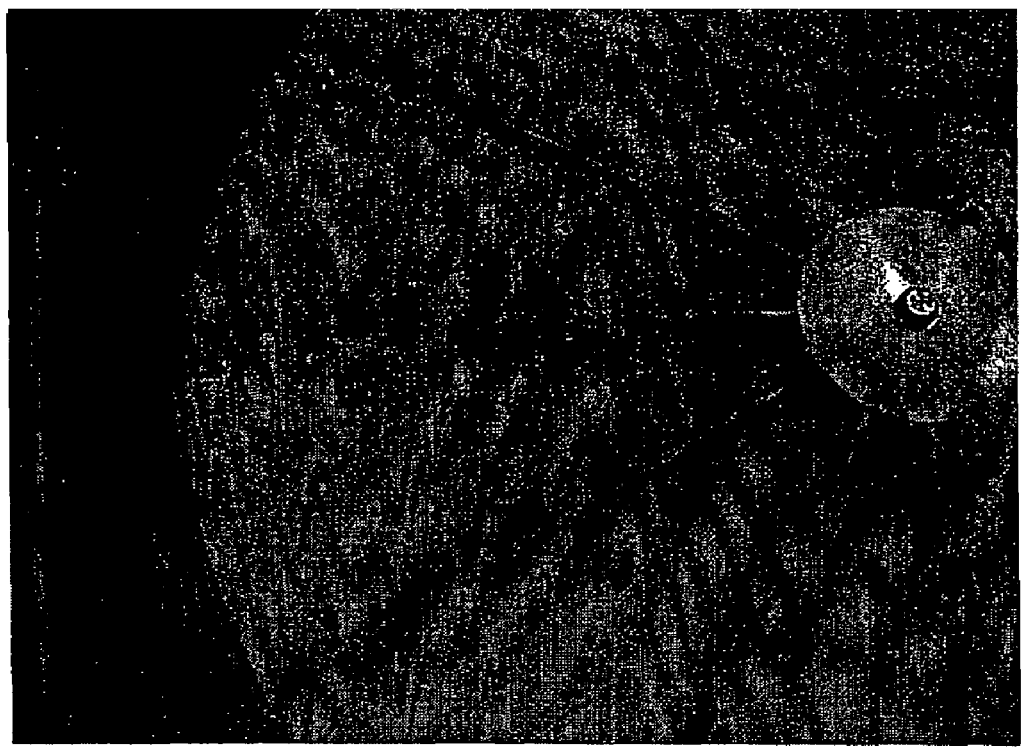
Figure 14:
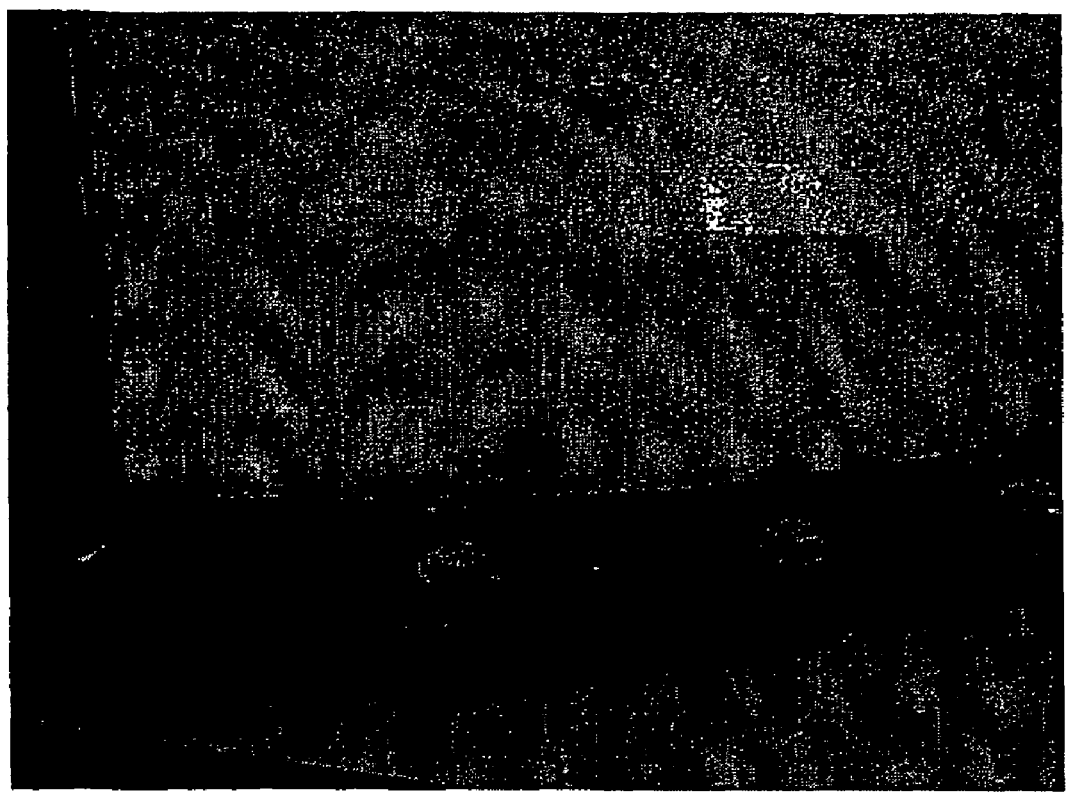
Figure 15:
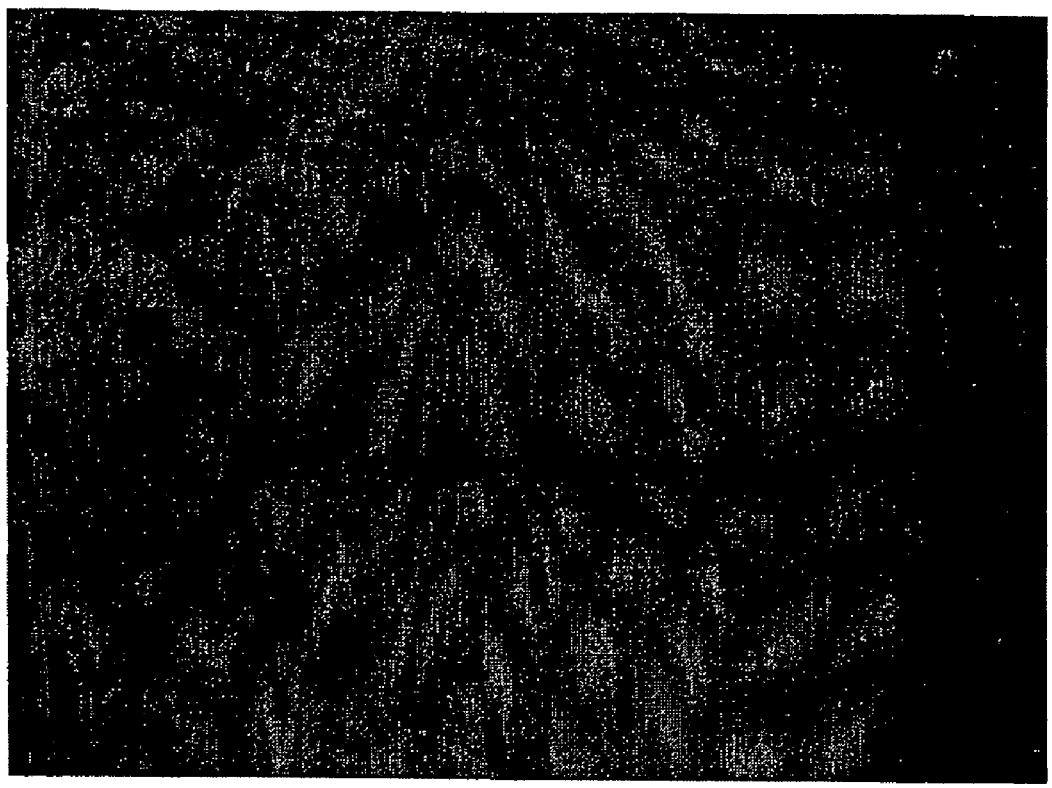

The cavity 32 is sealed to the base part of the column in order to prevent fluid from entering or leaving the cavity 32 in other ways than through the fluid inlet 42 or the openings of the tubes within the cavity, respectively. The sealing device used must permit the distributor to be rotated and ideally should permit the distributor to be removed from the column base plate for inspection, servicing, cleaning or replacement. An intermediate part, shown in close up in FIG. 7a, is attached to the base part of the column by use of bolts screwed into the threaded holes 44 shown in FIG. 6. This intermediate part is collar shaped having the same external diameter as the circular base part 30 and the same internal diameter as external diameter of the cavity 32. Sealing between the abutment surface of the circular base part 30 and the abutment surface of the intermediate part is provided by a lip seal arranged in grooves provided in these surfaces (the groove in the circular base part 30 is shown in FIG. 1 and is referenced by numeral 38) and allows rotation of the distributor.

The distributor 10 is fixed to the driving shaft 40 by use of a bolt penetrating the circular base part 30 for engagement with a threaded bore 42 provided in the driving shaft 40.

Figure 21:
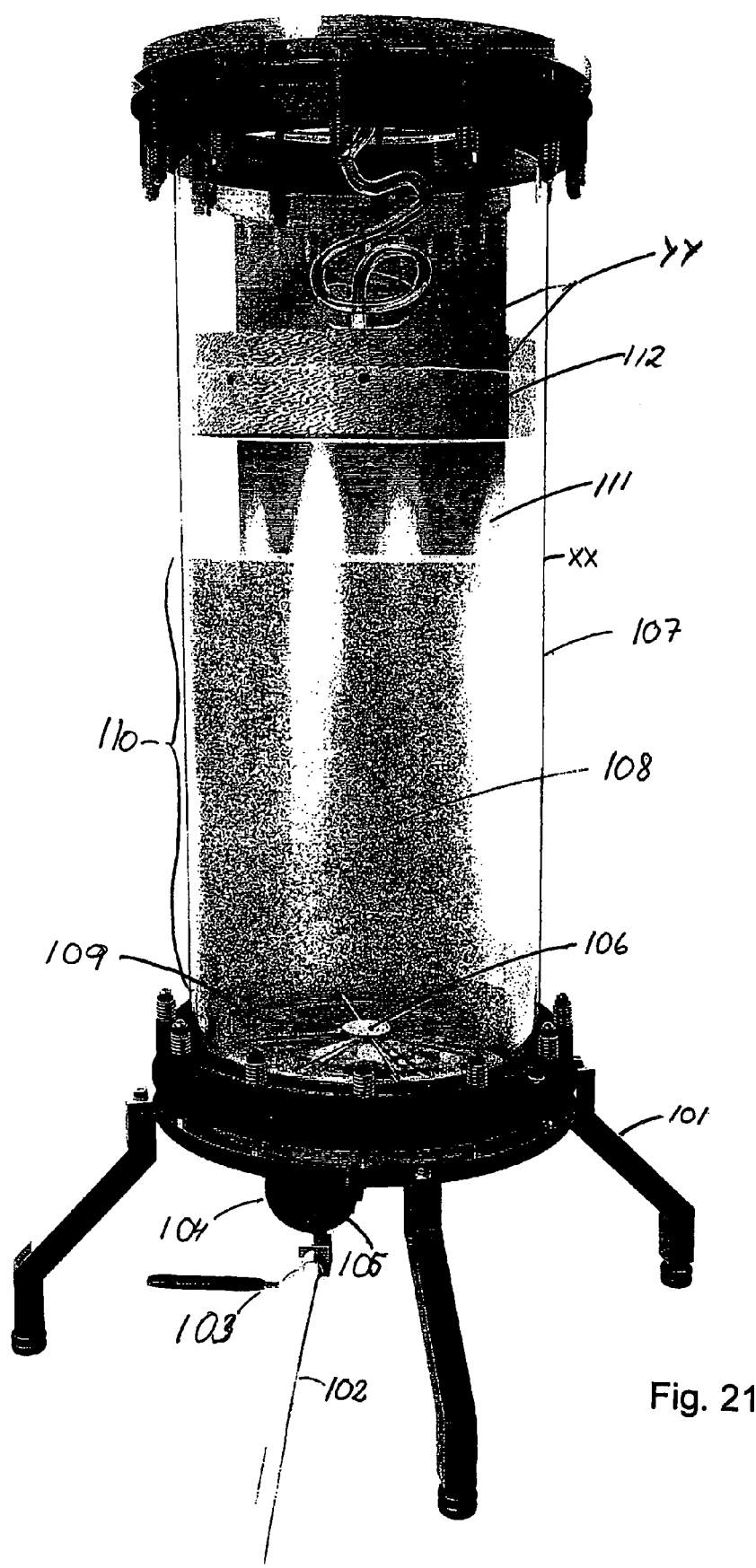
FIGS. 21 and 22 Shows a photograph of an up-flow expanded bed column according to the present invention.
Figure 22:
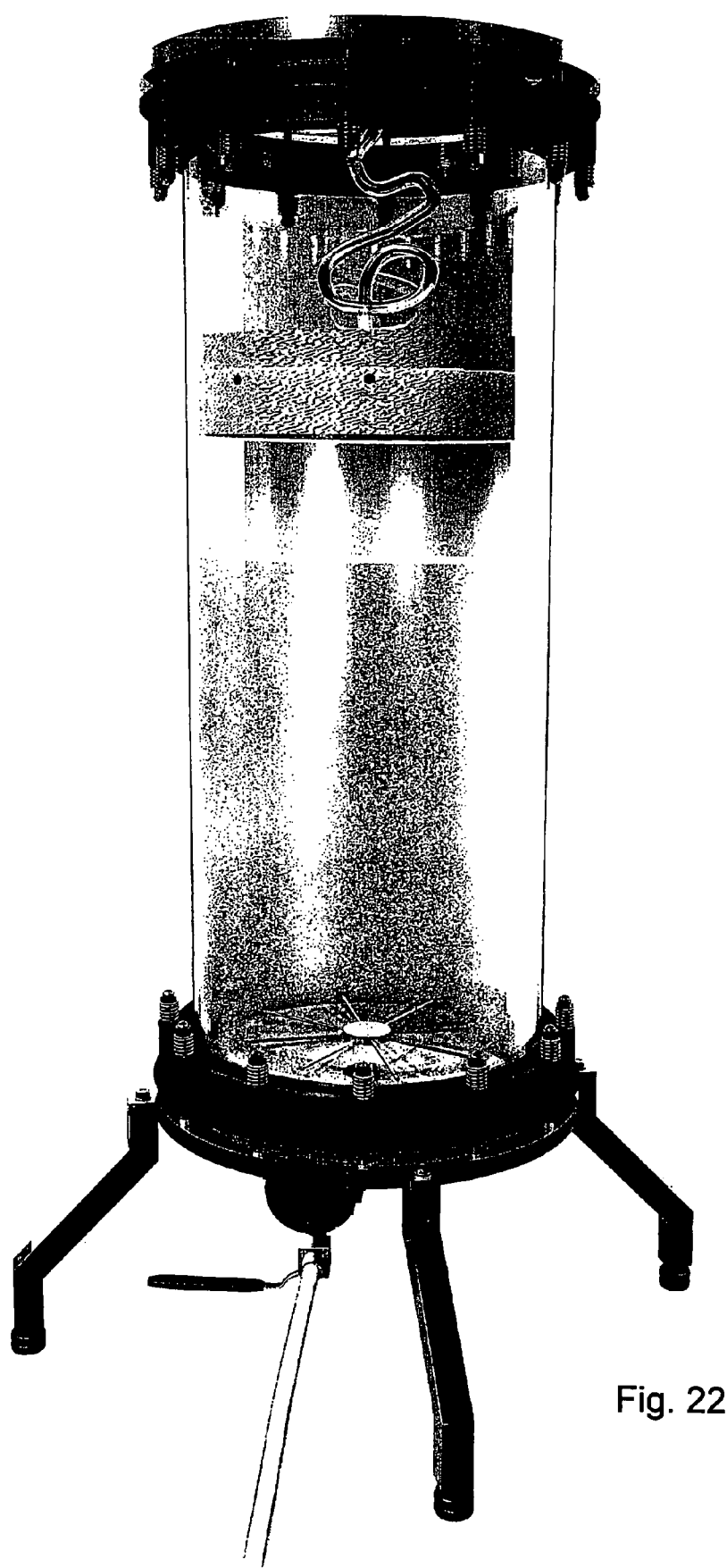
Figure 23:
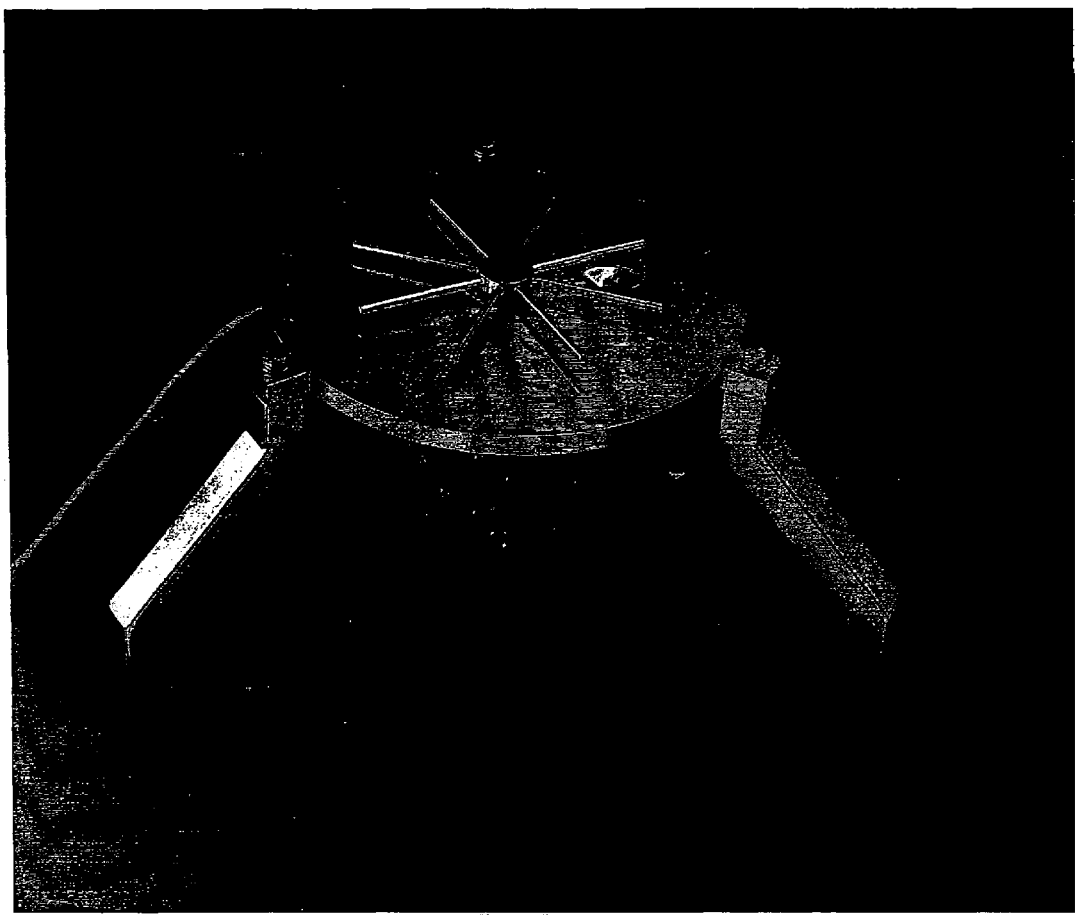
FIGS. 23 and 24 show photographs of details of the bed column shown in FIGS. 21 and 22.
Figure 24:
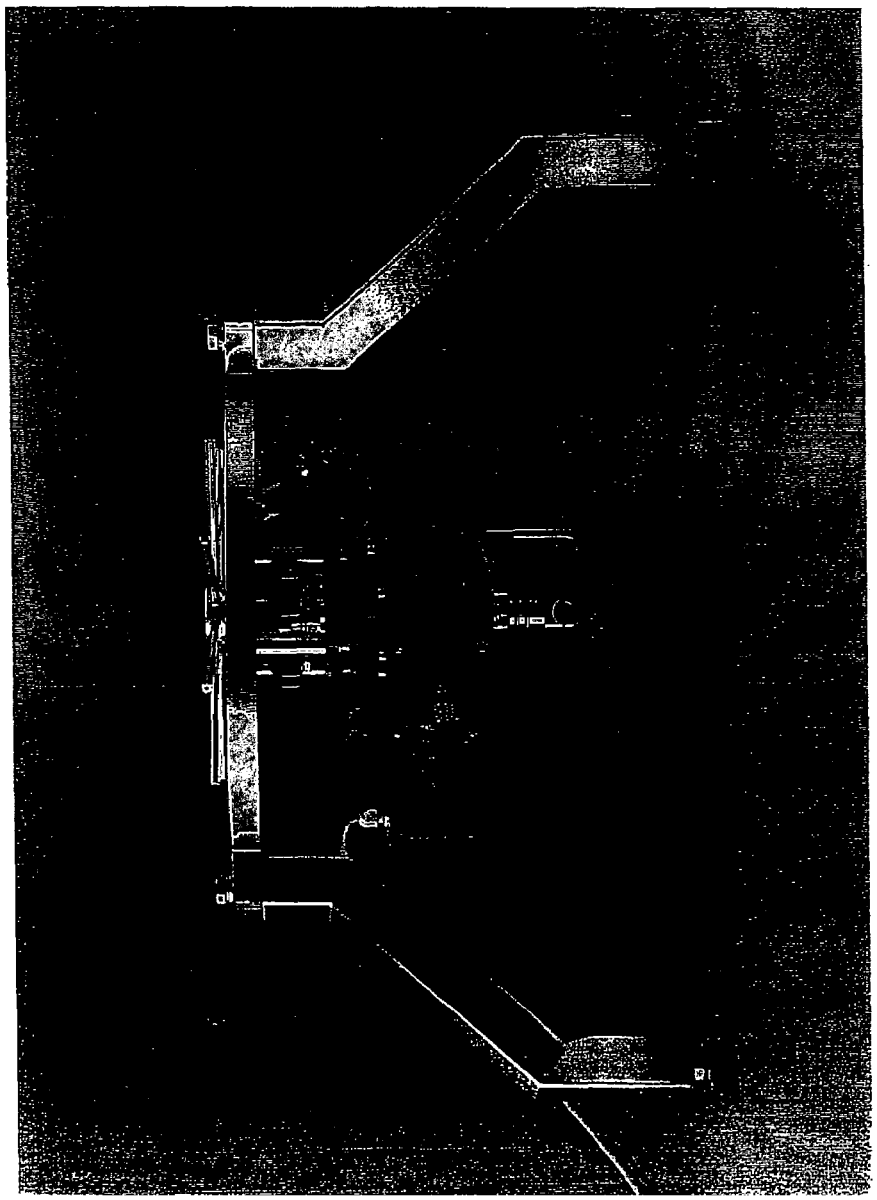
Figure 25:
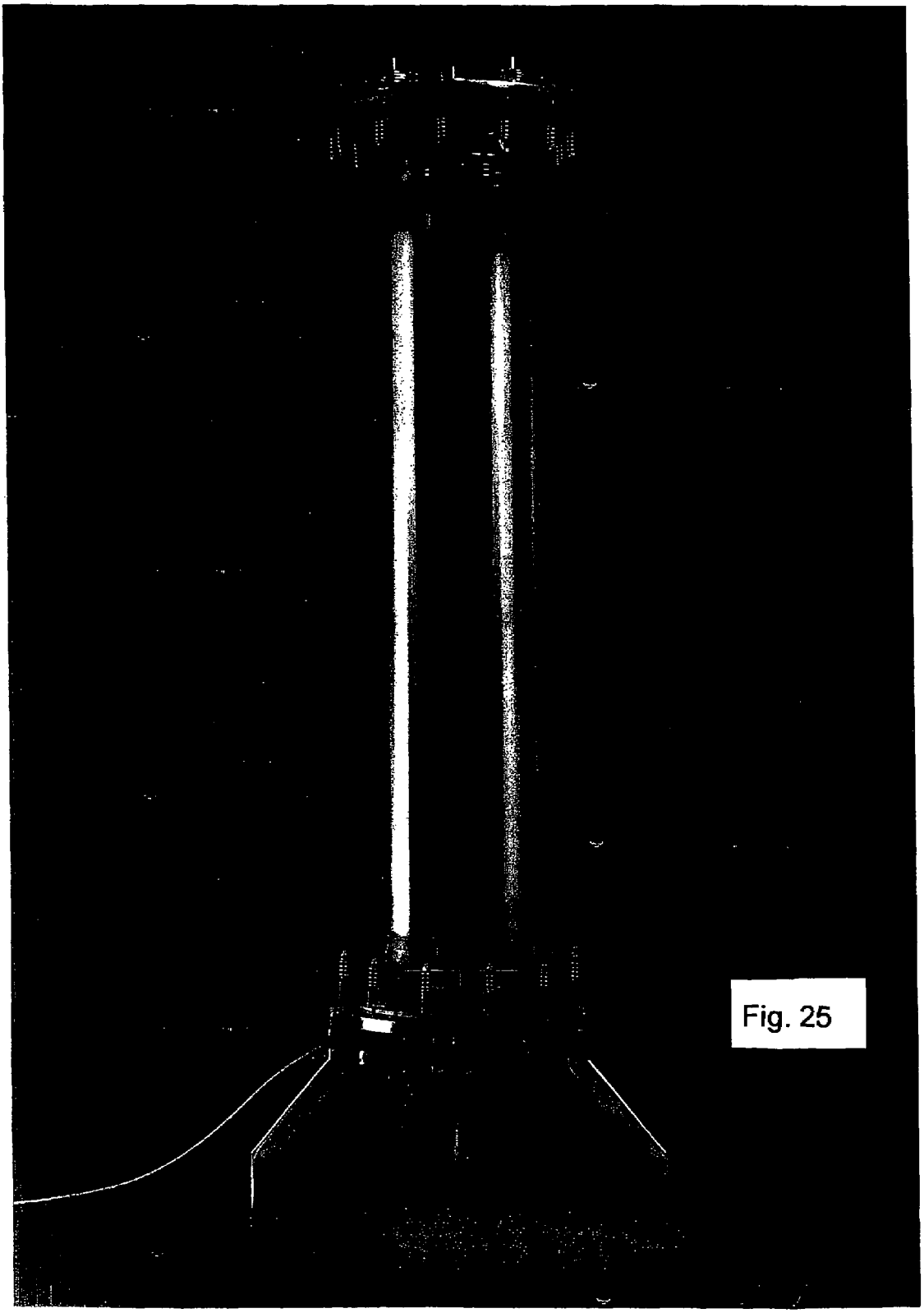
FIG. 25 shows a photograph of the bed column shown in FIGS. 21 and 22 with parts taken out from the interior of the bed.
Figure 26:
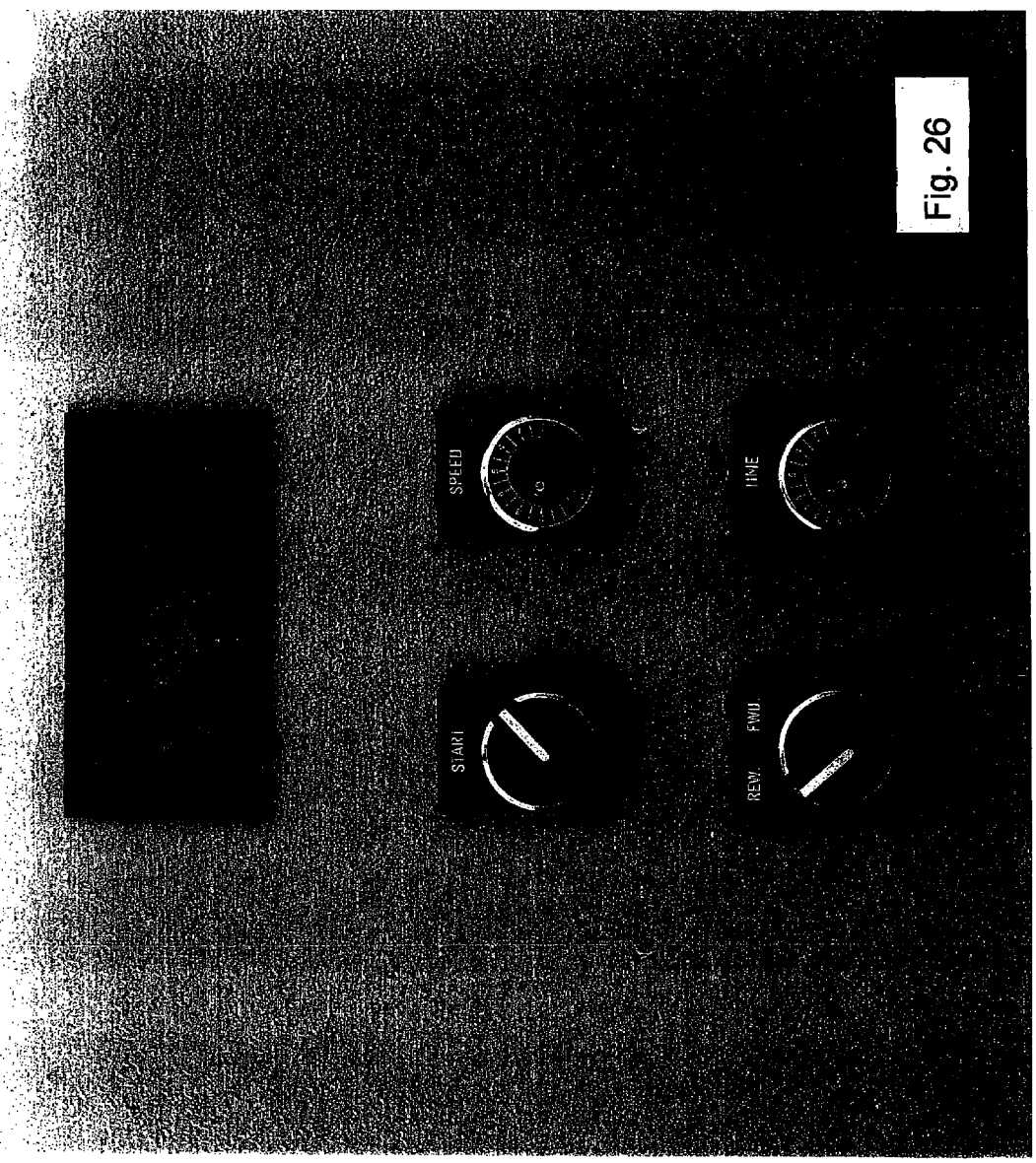
FIG. 26 shows a photograph of a control panel for controlling a bed system according to the present invention.

An example of an up-flow expanded bed column comprising a distributor according to the invention is shown in FIG. 21. With reference to FIG. 21 the column comprises:
  a base plate on adjustable feet 101 (to adjust the column into a vertical position),
  an inlet tube 102,
  an inlet valve connected to a rotating joint. 103, a motor for rotating the distributor 104, a hollow shaft 105 (not visible) connected to the rotating joint and penetrating the base plate through the motor.

a central distribution chamber 106, distributing the incoming liquid into 8 hollow tubes. The distribution chamber and the tubes are rotated and the incoming liquid is distributed on the surface of the base plate through holes pointing downwards.

a column tube 107, a solid phase matrix 108, expanded by the up-ward flow of liquid to position xx a mixing zone with intensely mixed solid phase matrix and incoming liquid 109 a plug flow zone without back-mixing 110 a liquid interface without solid phase matrix 111 a floating outlet unit 112 collecting the liquid from the periphery of the outlet unit through holes, yy, into a central outlet tube (extendible) leaving the column through a top plate.

While a slow rotation of the distributor in general is preferred according to the invention, it is in many instances also preferred that the rotational direction is reversed within certain time intervals. Especially in large diameter columns (e.g. ∅>30 cm) such a reversal of the rotational direction (i.e. from clockwise rotation to counter clockwise direction and vice versa) will prevent the expanded bed of solid phase matrix in engaging in a rotational movement that may extend all the way to the top of the expanded bed (and in some instances create a wave like movement of the entire bed).

The time lag between each reversal of the rotational direction may vary within broad limits such as from a few seconds to several minutes between each reversal. The reversal as well as the rpm of the distributors rotational movement may be controlled by an electronic control box comprising the necessary electronic components to perform such control of the motor working on the distributor. In connection with each reversal the acceleration of the motor may be slowed down to minimise the mechanical stress on the distributor arms and the solid phase matrix as well as minimising any disturbance/mixing effects on the plug flow above the distributor which might occur by an abrupt change of rotational direction.

Use of the Invention in an Expanded Bed Adsorption Column

EXAMPLE 1

The following example illustrates the effect of using a rotating distributor as described above, comprising an arrangement of hollow steel tubes fitted with fluid outlet holes in an EBA column having a diameter of 150 cm. In this example the effect of flow rate on bed expansion is demonstrated.

Procedure

The rotating fluid distributor system described above was fitted to the EBA column by using bolts in the threaded holes (44: see FIG. 6) to fix the intermediate part (see FIG. 7*a*) onto the stainless steel base plate. The EBA column itself was specially constructed using a transparent material—PVC—so that the performance of the distributor could be monitored visually. The PVC column contained no internal protrusions, furthermore the base plate of the column was completely flat as can be seen in FIG. 6 and FIG. 7. The EBA column containing the distributor was initially filled with a suspension of a solid phase medium in water. The solid phase medium was a non-derivatised agarose/glass conglomerate (UFC Agarose beads D, product number 6902, UpFront Chromatography AIS, Denmark) having a bead density of approx. 1.5 g/ml and a particle size distribution between 100-300 µm in diameter). In total about 620 litre of the solid phase medium was loaded to the column by pumping the suspension of the solid phase medium (matrix) through a valve in the bottom of the column. After loading of the solid phase suspension the matrix beads were allowed to settle (sediment) on the bottom of the column (i.e. no pumping of fluid into the column). After sedimentation for about 15 minutes the settled bed height was measured to be 35 cm.

Following this, water with a volumetric flow rate of 5000 l/hour was pumped into the column through the distributor according to the invention.

In the initial phase the distributor was not rotating in order to ensure that the solid phase medium was first somewhat fluidised (loosened up) in the vicinity of the steel tubes (the elongated tubes 20) of the distributor. During this procedure it was observed that water was flushing through the holes present in the end of the steel tubes and a strong jet stream pointing out against the column tube wall and floor could be seen. It was not possible to observe; the flow of water through the holes present further into the column due to the presence of the solid phase medium. After the initial flushing with water the distributor was engaged to rotate with a relatively low speed of 2.5 rotations per minute (2.5 RPM).

Figure 27:
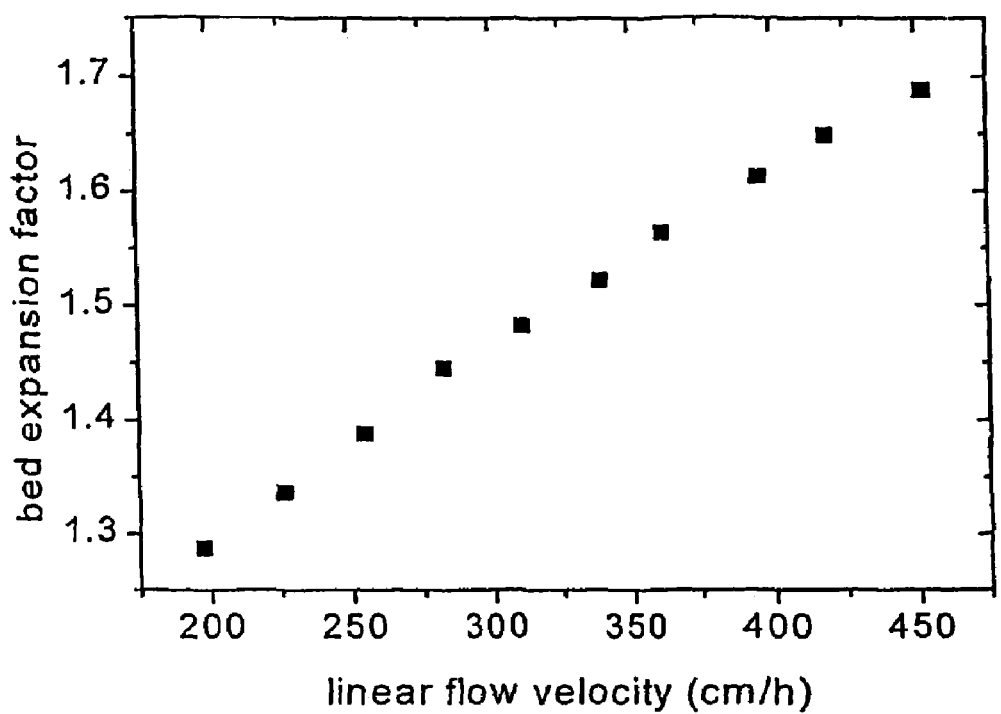
FIG. 27 shows in a graph the effect of flow velocity on bed expansion. Linear flow velocities of 200 to 452 cm/h were used, corresponding to volumetric flow rates of 3,500 to 8,000 L/h.

During a time period of 5-10 minutes the solid phase medium gradually raised (expanded) in the column until an expanded bed height of 53 cm had been reached. At this point no further expansion of the solid phase was observed in the column (corresponds to a degree of expansion of 53/35=1.5). Thereafter, the flow rate was changed to between 3500 to 8000 L/h. The expanded bed height was then measured and the bed expansion factor was calculated as the ratio of the expanded bed height to the settled bed height. A linear relation between bed expansion factor and flow rate was seen (FIG. 27), indicating that the fluid distributor evenly distributed the fluid over the cross sectional area of the column. If fluid distribution was poor leading to channeling, the bed would not expand sufficiently, and curvature of the expansion curve seen would be expected.

EXAMPLE 2

The rotating distributor and the column with solid phase medium as described in example 1 was further tested for generation of a stable expanded bed by examining the effect of distributor rotation rate on bed expansion.

Figure 28:
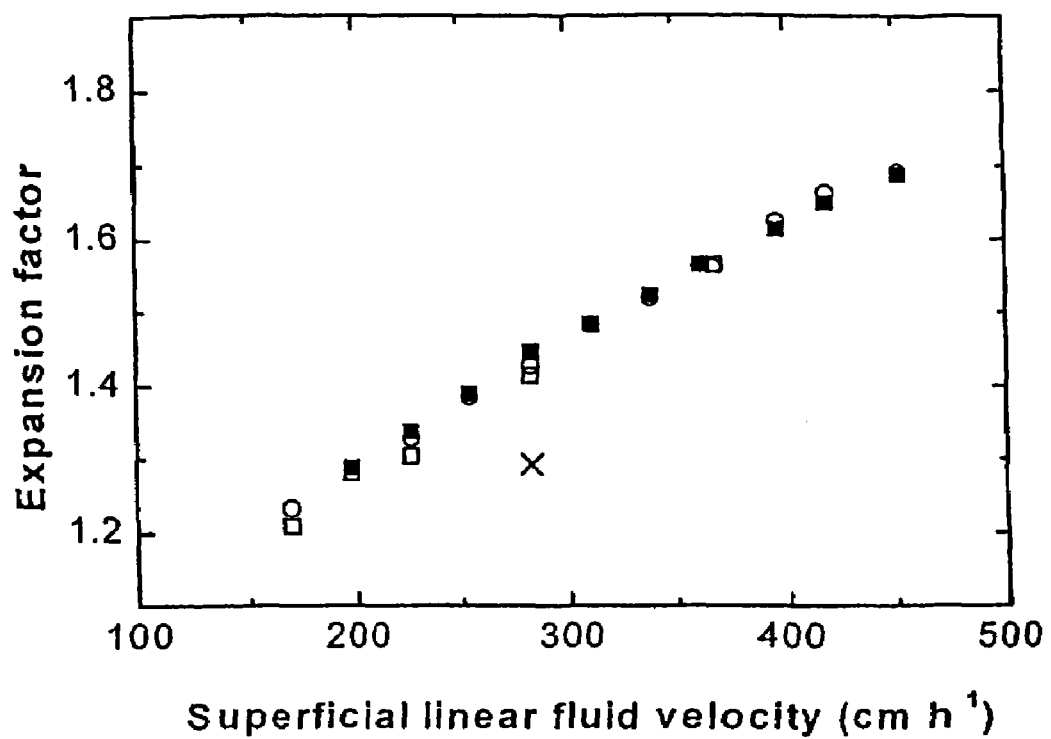
FIG. 28 shows in a graph the effect of flow velocity on bed expansion was investigated at different distributor rotation rates. Linear flow velocities of 170 to 452 cm/h were used, corresponding to volumetric flow rates of 3,000 to 8,000 L/h. Distributor rotation rates were: Rotation rates of: (x) 0 rpm, (■) 2.5 rpm; (□) 3.75 rpm; and (●) 7.5 rpm were used.

The bed was fluidised as described in example 1 and then the expanded bed height was measured at different combinations of flow rate and distributor rotation rate. The bed expansion factor was then calculated as the ratio of expanded bed height to settled bed height. When the distributor was not rotated, bed expansion was poor. (FIG. 28) demonstrating that rotation of the distributor is required to give the best bed expansion. No significant changes in the degree of expansion where observed by using a distributor rotation rate of 2.5 rpm to 10 RPM (FIG. 28). The result suggests that even fluid distribution was provided by the distributor when rotated at a wide range of rates and suggests a large window of operation is possible. Adequate and stable bed expansion is necessary to provide adequate voidage in the column (i.e. space between the solid phase supports) so that when particulate containing feedstocks are processed, the bed will not be clogged up.

EXAMPLE 3

The rotating distributor and the column with solid phase medium as described in example 1 was further tested to examine the flow resulting in the column by visualising fluid flow via the use of dye tracers.

Figure 29:
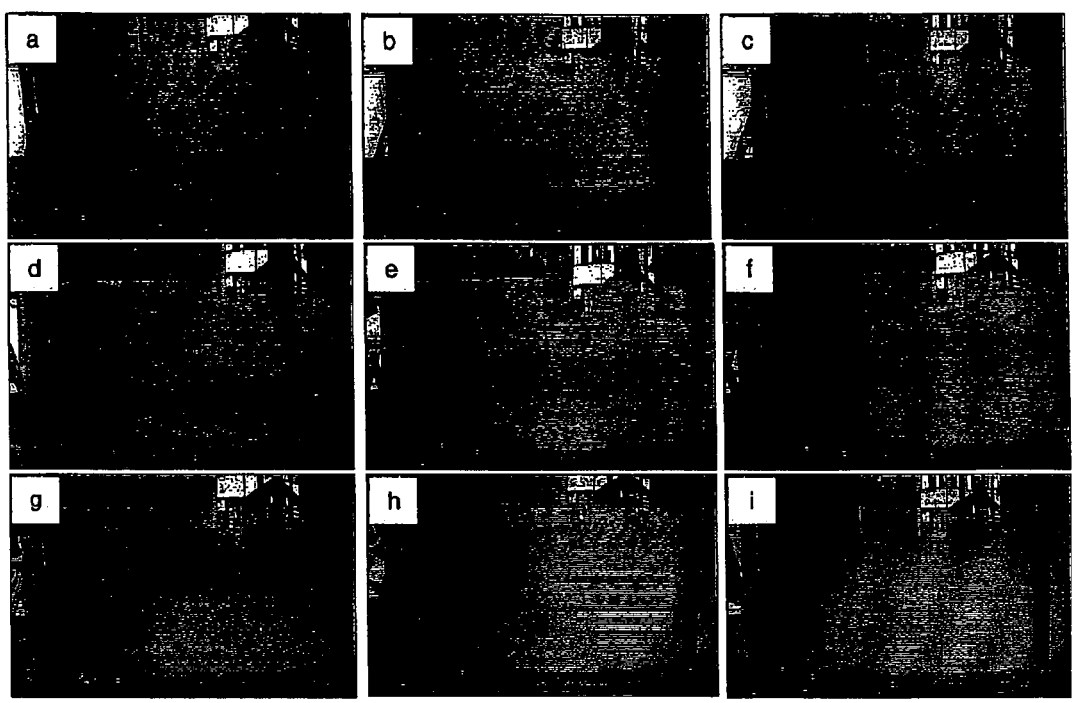
FIG. 29 shows photographs of dye movement at the column wall taken at various times after addition of a dye pulse: (a) 9 s, (b) 30 s, (c) 60 s, (d) 120 s, (e) 180 s, (f) 240 s, (g) 300 s, (h) 360 s, (i) 420 s. Rotation rate was 2.5 rpm, superficial linear flow velocity was 283 cm h$^{-1}$ (volumetric flow rate was 5000 L/h), settled bed height was 35 cm and expanded bed height was 53 cm. Direction of movement of the distributor blades was from right to left.

The bed was fluidised as described in example 1 at a volumetric flow rate of 5000 L/h and the distributor was rotated at 2.5 rpm. Using procedures commonly known to those involved in the art of expanded bed adsorption, a volume of 200 ml of a solution of freshly prepared bromophenol blue (10 g/L in 1 M NaOH) was prepared and then added to the column through a sample loop whilst the bed was fluidised with tap water at a flow rate of 5000 L/h. The location of dye near the column wall was then documented by taking photographs. It was observed that when dye first entered the column, a jet of dye penetrated to the corner of the wall and base plate (FIG. 29a) demonstrating that the fluid coming out of the outlet holes of the distributor was successfully directed downwards and was able to move the solid phase support from underneath the distributor. After 30 s a discrete band of dye was formed in a localised area at the bottom of the column and no areas without dye could be seen, demonstrating that dead zones underneath the distributor were not present (FIG. 29b). The dye band then progressed up the column, maintaining its integrity as a discrete band and demonstrating a plug flow like fluid regime was created by the fluid distributor (FIGS. 29c to 29l). A plug flow like fluid rise in the column suggests that back mixing and axial dispersion is low which is necessary for a successful EBA process.

EXAMPLE 4

The rotating distributor and the column with solid phase medium as described in example 1 was further tested to examine the flow properties produced in the column by comparing dye movement at the column wall and in the centre part of the expanded bed. The flow rate of fluid between the expanded solid phase support, is called the interstitial fluid velocity and this was determined in two separate types of experiments. The results were then compared to determine more carefully if fluid channeling or dead zones were present in the column.

Figure 30:
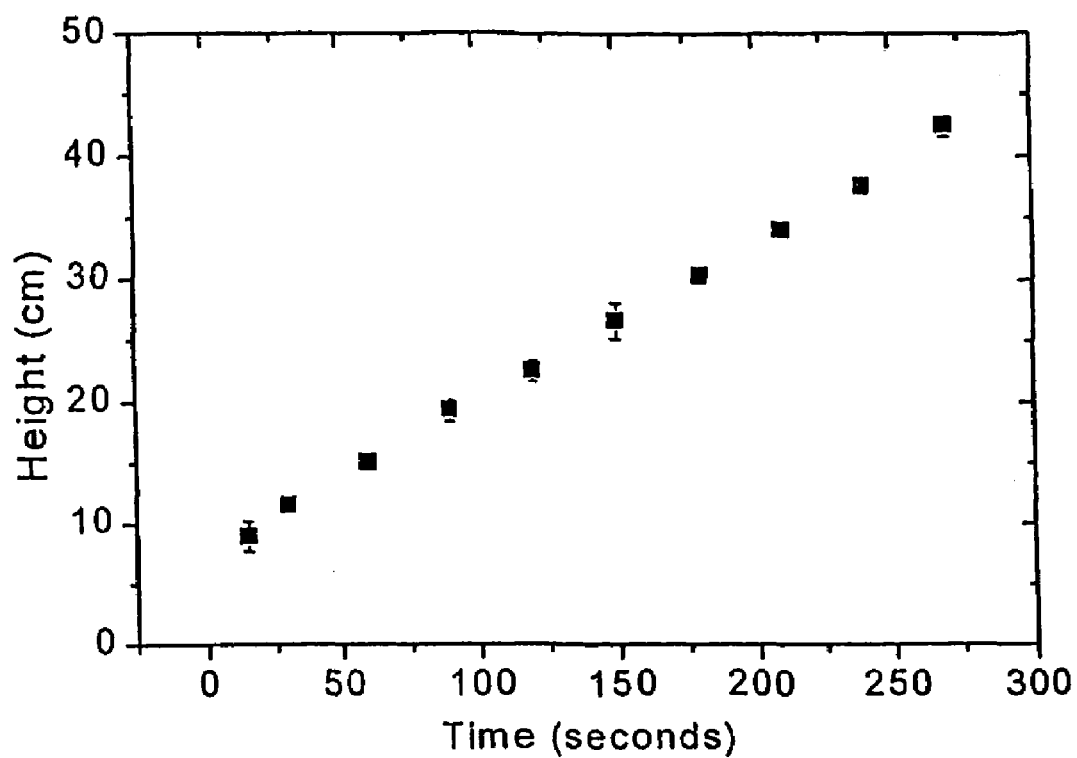
FIG. 30 shows in a graph rate of dye band movement measured at the column wall. Closed symbol: top of band; open symbols: bottom of band. The distributor was rotated at 2.5 rpm. Error bars indicate standard deviations of three separate experiments.

Dye was added to the column as described in example 3 and then the distance from the column base plate to the top of the band was recorded at the column wall. The results in FIG. 30 show that the top of the band moved at a constant rate of 468 cm/h (which is equivalent to the interstitial fluid velocity) up the column. The pattern of dye breakthrough at the bed surface was then examined by removing the column top piece and adding a dye pulse to the column through a sample loop as described in example 3 and observing dye appearance at the expanded bed surface. It was found that the dye broke though the bed surface in a large circle approximately 100 cm in diameter, 335 seconds after dye tracer was added to the column. This equates to a dye movement rate, and an interstitial fluid movement rate of 570 cm/h in the central part of the column. The voidage of the bed can be calculated by those skilled in the art of expanded bed adsorption when the expanded bed height is known, the settled bed height is known and assuming a settled bed voidage of 0.4. From the determined bed voidage, the theoretical rate of travel of the dye can be determined. The results in table 1 demonstrate that dye at the centre part of the column moved slightly faster than predicted from theory and that at the wall moved slower. This demonstrates that the distributor gives a parabolic flow profile in the column, which is suitable for expanded bed adsorption and also suggests that any channeling in the column is low and not at a level likely to cause serious impairment of the column performance.

EXAMPLE 5

The rotating distributor and the column with solid phase media as described in example 1 was further tested for the ability to generate a flow pattern suitable for expanded bed adsorption by determination of the number of theoretical plates per meter (residence time distribution measurement, RTD). The negative step input method as described in the hand book 'Expanded Bed Adsorption' by Amersham Pharmacia Biotech, Sweden, and which is commonly used by those skilled in the art of expanded bed adsorption was used for assessing the performance of the system.

A solution of acetone (0.5% in water) was pumped into the column with a flow rate of 5000 l/hour and the breakthrough of acetone at the outlet of the column was followed by continuous measurement and recording of the absorbency of the fluid at a wavelength of 280 nm (UV light). When the acetone was coming out of the column with a constant concentration according to the UV signal, the fluidising solution was switched from acetone back to water. The washing with water was performed with the same flow rate of 5000 l/hour. Washing the column with water was continued until all acetone was washed out according to the recorded UV signal, the experiment was stopped and the number of plates per meter was calculated/determined from the recorded UV signal.

The result of the experiment indicated that the rotating distributor and the fluid bed system had a plate number (N) of: N=103 per meter settled bed of solid phase support, which is indicative of a system with a low amount of back-mixing and turbulence and indicates performance suitable for expanded bed adsorption.

The fact that such a high plate number is obtainable with such a large column diameter creates an expectation that even columns with diameters having diameters in the range of 2-5 meter will work using this principle of distributing the fluid.

EXAMPLE 6

The rotating distributor and the column with solid phase medium as described in example 1 was further tested for suitability of the distributor to create appropriate flow conditions in the column by using residence time distribution experiments based on the pulse signal method. The theory behind this method is described by Levenspiel (Levenspiel O. 1999. Chemical reaction engineering, $3^{rd}$ ed. John Wiley and Sons, Inc. N.Y.) and is commonly used by those skilled in the art of expanded bed adsorption for assessing the performance of the system. Briefly, in this technique a pulse of tracer is added that does not interact with the solid phase support in the column and the release of tracer from the column is monitored. According to Levenspiel (1999), the resulting concentration versus time curve is then converted to a residence time distribution based on dimensionless time ($E_\theta$) and plotted against dimensionless time ($\theta$) and the results evaluated using the dispersion or tanks in series models. Using this technique it is commonly known by those skilled in the art that the total number of theoretical plates in an expanded bed column should be in the vicinity of 25 to 30 (see for example the hand book 'Expanded Bed Adsorption' by Amersham Pharmacia Biotech, Sweden).

Figure 31:
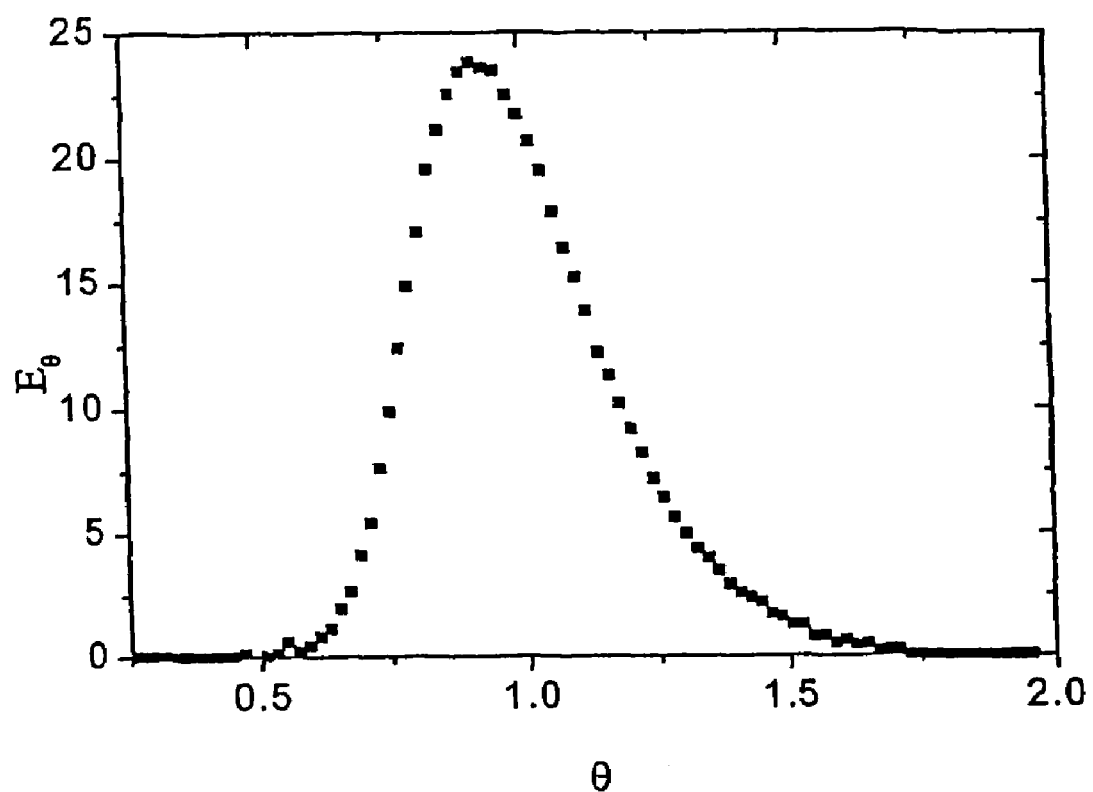
FIG. 31 shows in a graph residence time distribution of a pulse of acetone added through the distributor being rotated at 2.5 rpm, volumetric flow rate was 5000 L/h.

In this example, for the residence time distribution (RTD) studies, a 30.9 cm high bed of settled solid phase media was fluidised with water at a flow rate of 5000 L/h using the distributor being rotated at 2.5 rpm. Freshly prepared acetone in water (600 ml, 50% v/v) was applied through the distributor to the column via a sample loop. A small stream (approximately 60 L h$^{-1}$) was split from the column outflow tube and passed via a peristaltic pump to a UV-1 detector (Amersham Pharmacia Biotech, Uppsala, Sweden) fitted with an industrial flow cell and a 280 nm filter. The output signal from the detector was captured every 10 seconds using Baseline 810, version 3.30, data acquisition software (Dynamic Solutions Division, Millipore, Bedford, Mass., USA). The detector output resulted in a bell shaped curve which was normalised to unity and then converted to a dimensionless exit age distribution curve ($E_\theta$) based on dimensionless time ($\theta$). Using standard techniques, the dimensionless variance of the RTD was used to determine the coefficient of axial dispersion ($D_{ax}$) and the number of theoretical plates (N). The result in FIG. 31 demonstrates a bell shaped curve with good symetry around the dimensionless time point ($\theta$) of 1. This combined with the lack of excessive tailing of the curve suggests a low amount of channelling in the bed and a low degree of backmixing and axial dispersion ($D_{ax}$). The RTD curve gives a $D_{ax}$ value of $6.08 \times 10^{-6}$ m$^2$s$^{-1}$ and a theoretical plate number of 29.4, equivalent to 95 plates per meter of settled bed, which agrees closely with the result of example 5 (above). The number of plates in the column and the coefficient of axial dispersion closely approximates the performance reported for much smaller columns of 60 cm diameter (equipped with a foulant susceptible perforated plate distributor) (see for example Hjorth R. Leijon P. Barnfield Frei AK, Jägersten C. 1998. Expanded bed adsorption chromatography. In: Subramanian G (ed.) Bioseparation and bioprocessing. Wiley VCH, Weinheim: 199-226).

EXAMPLE 7

The rotating distributor and the column with solid phase medium as described in example 1 was further tested for suitability of the distributor to create appropriate flow conditions in the column by using residence time distribution experiments based on the pulse signal method as described in example 6. In this example, the effect of distributor rotation rate on the column performance was examined.

Figure 32:
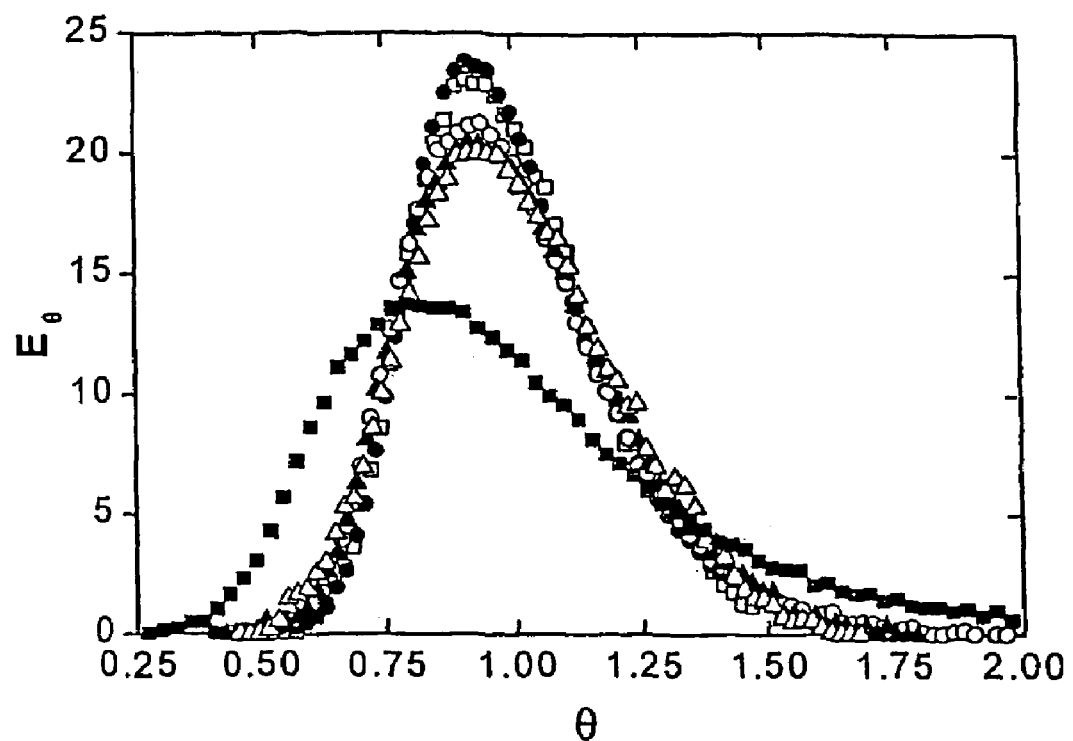
FIG. 32 shows in a graph the effect of distributor rotation rate on the dimensionless residence time distribution of an acetone tracer pulse. $E_\theta$ is the exit age distribution of acetone tracer based on dimensionless time ($\theta$). The distributor was rotated at (rpm): (■) 0, (□) 2.5, (●) 3.75, (○) 5, (▼) 7.5 and (Δ) 10.

The experiment was conducted as described in example 6, but in addition the residence time distribution of acetone was measured when the distributor was rotated at a number of different rotation rates. The results in FIG. 32 demonstrate only a small effect of changes in distributor rotation rate and highlight the robustness of the fluid distribution mechanism. The necessity for rotating the distributor can be clearly seen in FIG. 32. If the distributor is not rotated, channelling is observed by the early breakthrough of the tracer and excessive tailing of the RTD curve. The suitability of the distributor for expanded bed adsorption is further demonstrated (See table 2) when the number of theoretical plates and coefficient of axial dispersion are determined from the results in FIG. 32.

EXAMPLE 8

The rotating distributor and the column with solid phase medium as described in example 1 was further tested for suitability of the distributor to create appropriate flow conditions in the column by using residence time distribution experiments based on the pulse signal method as described in examples 6 and 7. In this present example, the effect on the column performance of changes in flow rate of fluid applied by the distributor was examined. The robustness of an EBA process to changes in flow rate is important since high flow rates may in general be preferred to give higher productivities in the column. However lowering of the flow rate may at times be required to control bed expansion, especially if a viscous feedstock is being treated.

Figure 33:
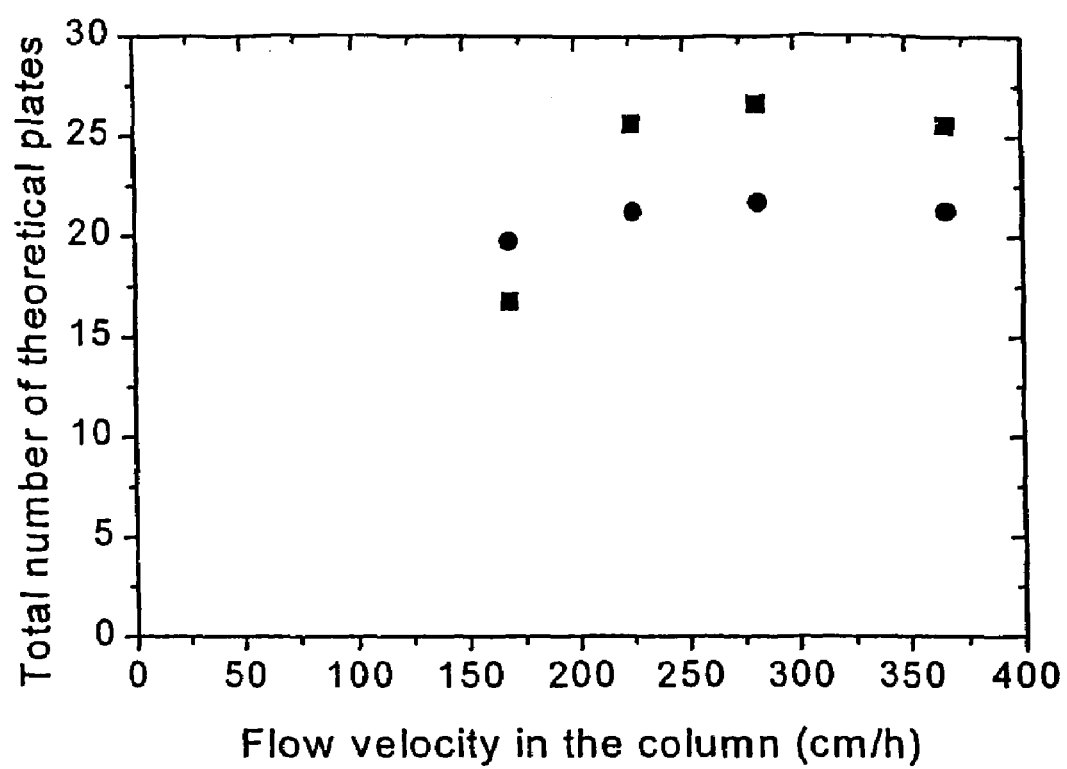
FIG. 33 shows in a graph the effect on the numbers of theoretical plates in the column generated by the rotating distributor when water was pumped to give flow velocities in the column ranging from 170 cm/h to 370 cm/h (3000 L/h to 6500 L/h).

The experiments were conducted as in example 6 except that two different distributor rotation rates were used: 3.75 rpm and 7.5 rpm and the residence time distribution of acetone tracer was measured at different flow rates of water being applied to the column. The residence time distribution curves that were obtained were used to calculate the number of theoretical plates. The results in FIG. 33 demonstrate the remarkable robustness of the fluid distribution means with respect to column performance between flow rates of 4000 L/h and 6000 L/h when the distributor is rotatated at 3.75 rpm. When a rotation rate of 7.5 rpm is used, the column performance is lower at flow rates between 4000 L/h and 6000 L/h, however at low flow rates the number of theoretical plates is higher than at 3.75 rpm. This result demonstrates an important aspect of the distribution design, namely the ability to improve fluid distribution by modulating the rotation rate of the distributor.

The invention claimed is:

1. An expanded fluid bed system for use in treating a fluid by contacting the fluid with a solid phase media contained in the expanded fluid bed system which system comprises:
    a reactor chamber having an upper end and a lower end to contain the solid phase media and
    at least one fluid distribution means adapted to be rotated and to distribute and deliver the fluid to be treated among the particles of the medium, in a substantially uniform manner over a cross sectional area of the fluid bed system, which system is sized and dimensioned to operate under plug flow conditions, wherein
    said fluid distribution means includes a number of elongated tubes extending radially outwards towards an outer periphery of the reactor chamber; each elongated tube has penetrations extending from the inside of the tubes to the outside thereof so that the fluid to be treated flows through the internal of the tubes via the penetrations and to the medium, and wherein
    said tubes have cross sections shaped, so that generation of turbulence induced by said rotation is avoided, when the fluid distribution means is rotated with an rpm lower than 10.

2. A fluid bed system according to claim 1, wherein the at least one fluid distribution means is placed inside the reactor amongst the solid phase media and through which the fluid to be treated is delivered and distributed.

3. A fluid bed system according to claim 1, further comprising rotating means for rotating the fluid distribution means during distribution/deliver of the fluid so that the fluid is distributed/delivered substantially uniformed, or uniformed, in a zone of the medium when observed during a characteristic time.

4. A fluid bed system according to claim 3, wherein the fluid distribution means comprises a central chamber into which the fluid to be treated is pumped and the at least one hollow elongated tube extends radially outwards from the center of the distributor chamber towards an outer periphery of the reactor chamber.

5. A fluid bed system according to claim 3, wherein each of the at least one elongated tube is or is not be completely sealed at the end.

6. A fluid bed system according to claim 1, wherein at least some of the penetrations are orientated/shaped in such a manner that the fluid exits the penetrations in a direction being downwardly inclined.

7. A fluid bed system according to claim 6, wherein the fluid exits the penetrations in a direction being inclined 45° downwardly with respect to the horizontal.

8. A fluid bed system according to claim 6, wherein the fluid exits the penetrations in a direction being inclined 90° downwardly with respect to the horizontal.

9. A fluid bed system according to claim 1, wherein the radius or the hydraulic radius, defined as the ratio of the cross-sectional flow area to the wetted perimeter, of the penetrations is such as to prevent substantial plugging or choking of the penetrations.

10. A fluid bed system according to claim 9, wherein substantial plugging or choking of the penetrations is prevented by the fluid to be treated.

11. A fluid bed system according to claim 1, wherein the radius or the hydraulic radius is between 0.5 mm and 1.0 mm.

12. A fluid bed system according to claim 1, wherein at least some of the penetrations are orientated/shaped in such a manner that at least some of the fluid exits the penetrations in a direction being perpendicular to the main flow direction in the reactor chamber.

13. A fluid bed system according to claim 12, wherein the fluid exits the penetrations in a horizontal direction.

14. A fluid bed system according to claim 1, wherein the inclination is measured as seen from a co-ordinate system rotating along with the fluid distribution means.

15. A fluid bed system according to claim 1, further comprising equalisation means adapted to equalize the distribution/delivery of the fluid to the solid phase media.

16. A fluid bed system according to claim 15, wherein the equalization means comprises a cavity through winch the fluid flows before entering into at least one elongated tube.

17. A fluid bed system according to claim 15, wherein the equalisation means is elongated tubes which have a constant or changing diameter over their length, combined with a distinct position and/or size of penetrations in the tubes to provide a substantially even fluid coverage of the cross sectional area of the swept area of the column base during a characteristic time when the distributor is rotated.

18. A fluid bed system according to claim 1, further comprising a fluid feed system adapted to feed the fluid to the distribution means.

19. A fluid bed system according to claim 1, wherein the fluid distribution means is arranged so that fluid distribution and/or deliver occurs at the lower end, or in the vicinity thereof, of the reactor chamber.

20. A fluid bed system according to claim 1, wherein the fluid distribution means is arranged so that fluid distribution and/or deliver occurs at the upper end, or in the vicinity thereof, of the reactor chamber, such as in the vicinity of the free surface of the fluidizing fluid.

21. A fluid bed system according to claim 1, wherein the bed system is an adsorption bed system.

22. A fluid bed system according to claim 21, wherein the adsorption bed system is an Expanded Bed System.

23. A fluid bed system according to claim 1, wherein the medium is a chromatographic medium.

24. A fluid bed system according to claim 1, wherein the fluid distribution means is adapted to deliver and/or distribute the fluid so as to fluidize the medium.

25. A fluid bed system according to claim 1, wherein the solid phase medium is an adsorption medium and wherein the fluid bed system is used to remove one or more components from the fluid by an adsorption process in which the fluid is contacting the adsorption medium.

26. A fluid bed system according to claim 1, wherein the distribution means is adapted to rotate during distribution/delivery of the fluid to be treated.

27. A fluid bed system according to claim 26, wherein the distributor is adapted to rotate with a rotational speed in the range of 1-5 rpm.

28. A fluid bed system according to claim 27, wherein the distributor is adapted to rotate with a rotational speed in the range of 2-4 rpm.

29. A fluid bed system according to claim 27, wherein the distributor is adapted to rotate with a rotational speed of 3 rpm.

30. A fluid bed system according to claim 26, wherein the distribution means is adapted to rotate alternately clockwise and counter clockwise.

31. A fluid bed system according to claim 30, wherein the time lag between each reversal of the rotational direction is smaller than 1 seconds.

32. A fluid bed system according to claim 31, wherein the time lag between each reversal of the rotational direction is smaller than 2 seconds.

33. A fluid bed system according to claim 31, wherein the time lag between each reversal of the rotational direction is smaller than 5 seconds.

34. A fluid bed system according to claim 31, wherein the time lag between each reversal of the rotational direction is smaller than 15 seconds.

35. A fluid bed system according to claim 31, wherein the time lag between each reversal of the rotational direction is smaller than 30 seconds.

36. A fluid bed system according to claim 31, wherein the time lag between each reversal of the rotational direction is smaller than 1 minute.

37. A fluid bed system according to claim 31, wherein the time lag between each reversal of the rotational direction is smaller than 1.5 minutes.

38. A fluid bed system according to claim 31, wherein the time lag between each reversal of the rotational direction is smaller than 2 minutes.

39. A fluid bed system according to claim 31, wherein the time lag between each reversal of the rotational direction is smaller than 3 minutes.

40. A fluid bed system according to claim 31, wherein the time lag between each reversal of the rotational direction is smaller than 5 minutes.

41. A fluid bed system according to claim 1, wherein the system is adapted to have the fluid to be treated a liquid.

42. A fluid bed system according to claim 1, wherein the system is adapted to have the fluid to be treated a gas.

43. A fluid bed system according to claim 1, wherein the fluid bed system is an up-flow fluid bed system/reactor.

44. A fluid bed system according to claim 1, wherein the fluid bed system is a down-flow fluid bed system/reactor.

45. A fluid bed system according to claim 1, wherein each elongated tube has penetrations that are bores.

46. A fluid bed system according to claim 1, wherein the radius or the hydraulic radius is between 1.0 mm and 2.0 mm.

47. A fluid bed system according to claim 1, wherein the radius or the hydraulic radius is between 2.0 mm and 3.0 mm.

48. A fluid bed system according to claim 1, wherein the radius or the hydraulic radius is between 3.0 mm and 5.0 mm.

49. A fluid bed system according to claim 1, wherein the radius or the hydraulic radius is up to 7 mm.

* * * * *